United States Patent
Sugihara et al.

(10) Patent No.: US 7,337,096 B2
(45) Date of Patent: Feb. 26, 2008

(54) CALCULATION METHOD FOR PACKING A PLURALITY OF WIRES AND CALCULATION APPARATUS USING THE SAME

(75) Inventors: Kokichi Sugihara, Bunkyo-ku (JP); Masayoshi Sawai, Kosai (JP); Kohki Nagakura, Kosai (JP)

(73) Assignee: Yazaki Corporation, Tokyo (JP)

(*) Notice: Subject to any disclaimer, the term of this patent is extended or adjusted under 35 U.S.C. 154(b) by 345 days.

(21) Appl. No.: 10/992,119

(22) Filed: Nov. 19, 2004

(65) Prior Publication Data

US 2005/0150680 A1    Jul. 14, 2005

(30) Foreign Application Priority Data

Nov. 19, 2003    (JP)    ............................ P2003-389071

(51) Int. Cl.
    *G06F 17/50*    (2006.01)
(52) U.S. Cl. .......................................................... 703/1
(58) Field of Classification Search .................... 703/1
    See application file for complete search history.

(56) References Cited

U.S. PATENT DOCUMENTS

2002/0040256 A1    4/2002    Fujioka
2006/0096372 A1*   5/2006    Sugihara et al. ........... 73/432.1

FOREIGN PATENT DOCUMENTS

| JP | 6-47396 U   | 6/1994 |
|----|-------------|--------|
| JP | 9-237531 A  | 9/1997 |
| JP | 2003-179718 | 6/2003 |

OTHER PUBLICATIONS

Sugihara, Kokichi et al., Disk Packing for the Estimation of the Size of a Wire Bundle, Oct. 2004, Japan Journal of Industrial and Applied Mathematics, vol. 21 No. 3, p. 259-278.*
Kim, D.-S. et al., Voronoi diagram of a circle set from Voronoi diagram of a point set: I. Topology, Jul. 2001, Computer Aided Geometric Design, vol. 18, Issue 6, p. 541-562.*

(Continued)

*Primary Examiner*—Ngoc-Yen Vu
*Assistant Examiner*—James A Meyers
(74) *Attorney, Agent, or Firm*—Sughrue Mion, PLLC

(57) ABSTRACT

A calculation method for packing a plurality of wires constituting a wire harness comprises the steps of: removing a first circle from a plurality of circles; forming a primary inclusive circle as small as possible in which a plurality of second circles are included in the primary inclusive circle so as not to be overlapped with each other; calculating first position information regarding a position of the primary inclusive circle and the second circles included in the primary inclusive circle; forming a final inclusive circle as small as possible in which the first circle is arranged in the primary inclusive circle while the second circles are fixed in the primary inclusive circle in accordance with the position information such that the first circle and the second circles are not overlapped with each other; calculating and outputting second position information regarding a position of the final inclusive circle.

12 Claims, 12 Drawing Sheets

OTHER PUBLICATIONS

Kim, D.-S. et al., Voronoi diagram of a circle set from Voronoi diagram of a point set: II. Geometry, Jul. 2001, Computer Aided Geometric Design, vol. 18, Issue 6, p. 563-585.*

Lubachevsky, B. D. et al., Curved Hexagonal Packing of Equal Disks in a Circle, Sep. 1997, Discrete and Computational Geometry, vol. 18 No. 2, p. 179-194.*

Drezner, Zvi et al., Solving the Continous p-Dispersion Problem Using Non-Linear Programming, Apr. 1995, The Journal of the Operational Research Society, vol. 46 No. 4, p. 516-520.*

Wang, Huaiqing et al., An improved algorithm for the packing of unequal circles within a larger contianing circle, Sep. 2002, European Journal of Operational Research, vol. 141 Issue 2, p. 440-453.*

Arai, Makoto et al., Strategy for packing circles: vibration control approach, Jul. 1997, Intelligent Engineering Systems Through Artificial Neural Networks, vol. 7, p. 931-938.*

Spatial Tessellations, Concepts and Applications of Voronoi Diagrams, Second Edition, Atsuyuki Okabe, et al., 2000.

* cited by examiner

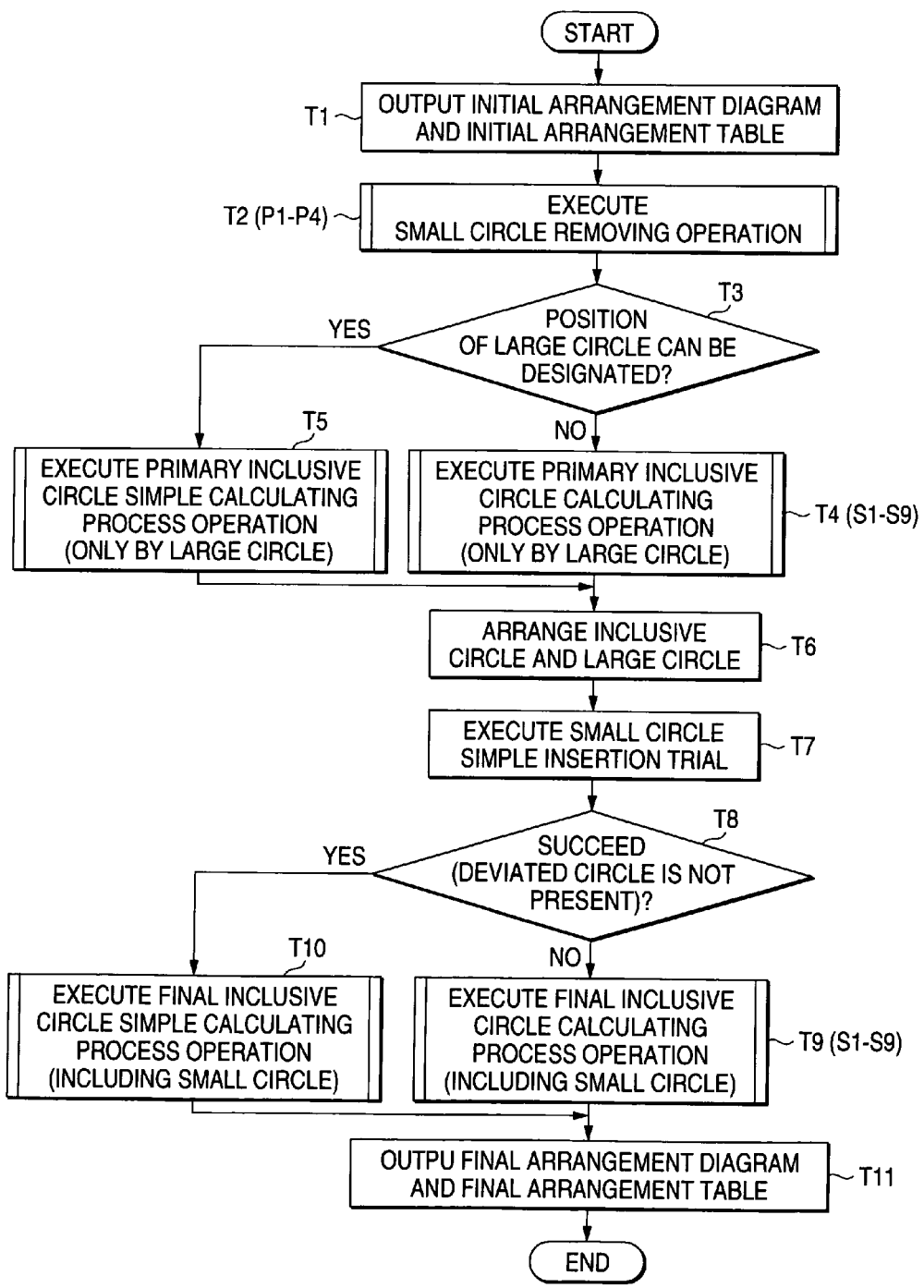

FIG. 6A

| INITIAL ARRANGEMENT ||||
| --- | --- | --- | --- |
| ELECTRIC WIRE ID | CENTER POSITION OF ELECTRIC WIRE || RADIUS OF ELECTRIC WIRE |
| 1 | $x_1$ | $y_1$ | $r_1$ |
| 2 | $x_2$ | $y_2$ | $r_1$ |
| 3 | $x_3$ | $y_3$ | $r_1$ |
| 4 | $x_4$ | $y_4$ | $r_2$ |
| 5 | $x_5$ | $y_5$ | $r_2$ |
| ⋮ | ⋮ | ⋮ | ⋮ |

FIG. 6B

| FINAL ARRANGEMENT |||||
| --- | --- | --- | --- | --- |
| ELECTRIC WIRE ID | CENTER POSITION OF ELECTRIC WIRE || RADIUS OF ELECTRIC WIRE | RADIUS OF INCLUSIVE CIRCLE |
| 1 | $x_1'$ | $y_1'$ | $r_1$ | $R_1$ |
| 2 | $x_2'$ | $y_2'$ | $r_1$ | |
| 3 | $x_3'$ | $y_3'$ | $r_1$ | |
| 4 | $x_4'$ | $y_4'$ | $r_2$ | |
| 5 | $x_5'$ | $y_5'$ | $r_2$ | |
| ⋮ | ⋮ | ⋮ | ⋮ | |

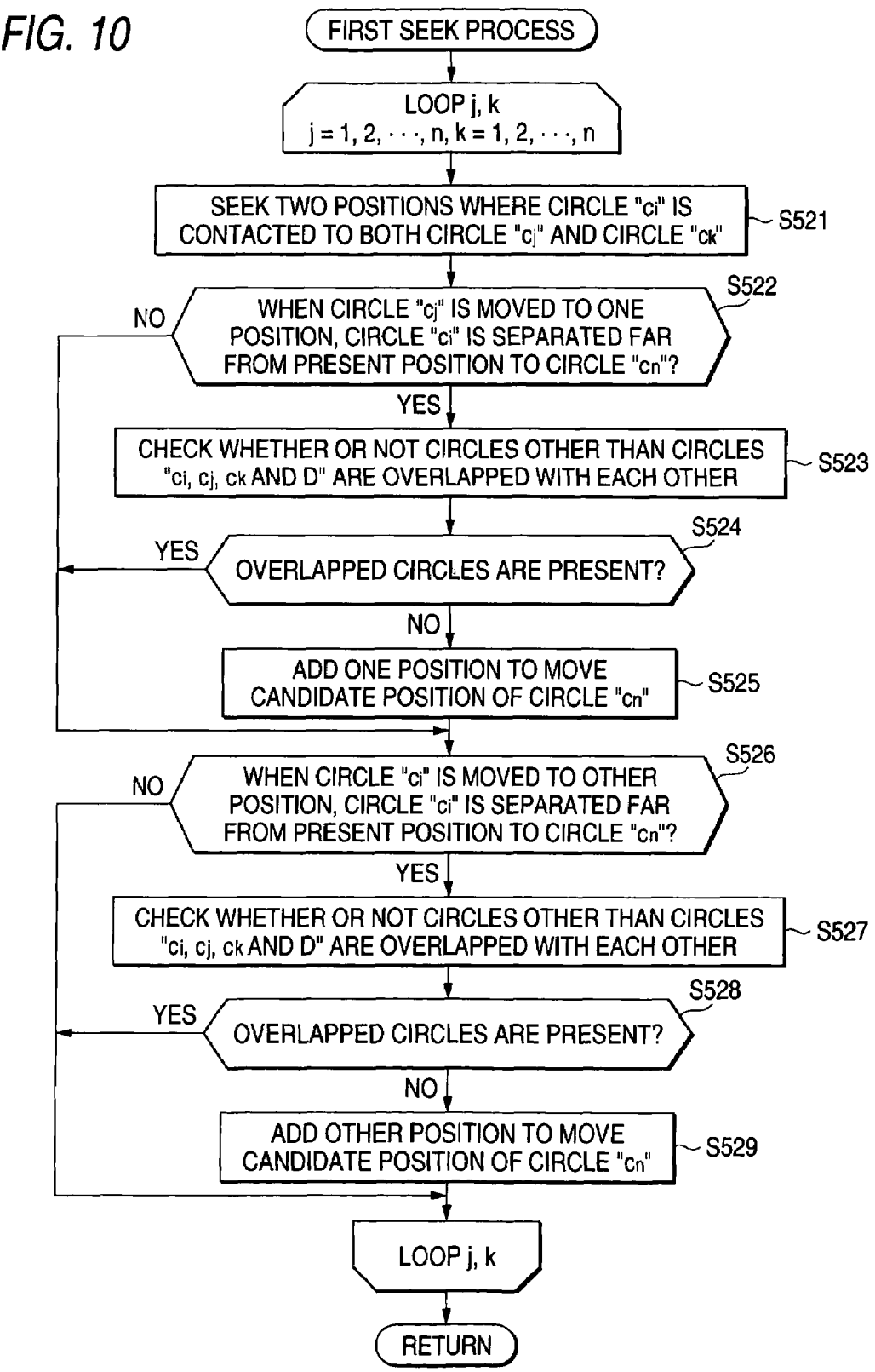

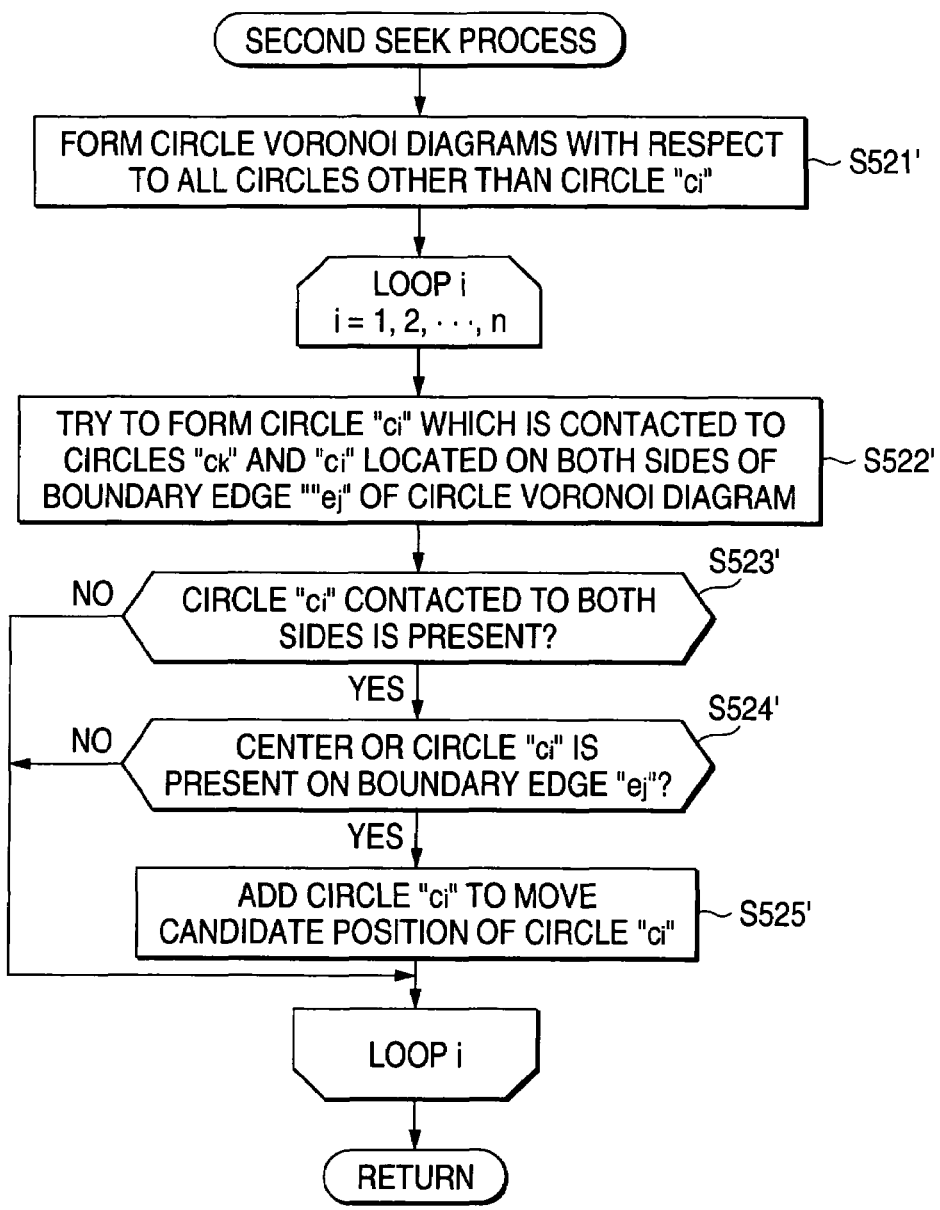

US 7,337,096 B2

CALCULATION METHOD FOR PACKING A PLURALITY OF WIRES AND CALCULATION APPARATUS USING THE SAME

BACKGROUND OF THE INVENTION

The present invention is related to a calculation method for packing a plurality of wires having different diameters which constitute a wire harness, or the like, as compact as possible, and is related to a wire packing calculation apparatus. More specifically, the present invention is directed to a wire packing calculation method and a wire packing calculation apparatus, capable of largely shortening packing calculation time.

In vehicles and indoor spaces, wire-shaped structural articles known as a "wire harness" have been arranged in distribution manners, while these wire-shaped structural articles are constituted by bundling wires such as a plurality of electric wires, and electrically connect electronic appliances, electronic components, and the like to each other. Very recently, there has been an increased demand to manufacture such a wire harness as compact as possible without lowering electric characteristics thereof in view of improvements in space efficiencies. To satisfy these requirements, a wire harness which is made as compact as possible should be previously calculated in design stages of the wire harness. Conventionally, no specific calculation method for effectively calculating such a wire harness in the design stage has been proposed.

Under such a circumstance, the Applicant of the present invention has proposed a calculation method in Japanese Patent Application No. 2003-179718. That is, in this calculation method, while a computer is employed, respective circles corresponding to sectional shapes of a plurality of wires are bundled in a circular shape as small as possible in such a manner that these circles are not overlapped with each other, and the bundled circles are packed, and then, both an outer diameter of this packed circles and positional information of the respective wires are acquired. As a result, an inclusive circle could be calculated when the plurality of circles are bundled in the circular shape as small as possible in such a manner that these plural circles are not overlapped with each other, and the bundled circles are packed, although this calculation could not be conventionally performed. An inclusive circle corresponds to a sectional area of wire harness in which a plurality of wires have been bundled.

Following publications are related to the present patent application. Non-patent publication 1: "Spatial Tesselations-Concepts and Applications of Voronoi Diagrams" written by A. Okabe, B. Boots, K. Sugihara and S. N. Choi, Version 2, John Wiley and Sons, Chichester in 2000, non-patent publication 2: "Voronoi diagram of a circle set from Voronoi diagram of a point set, I" written by D. S. Kim and K. Sugihara, pages 541 to 562, volume 18. Topology Computer Aided Geometric Design in 2001 and non-patent publication 3; "Voronoi diagram of a circle set from Voronoi diagram of a point set, II" written by D. S. Kim and K. Sugihara, pages 563 to 585, volume 18, Geometry Computer Aided Geometric Design in 2001.

The packing calculation method of Japanese Patent Application No. 2003-179718 can execute the general-purpose calculation of the inclusive circles in the case that the plural circles are bundled in the circular shape as small as possible in such a manner that these circles are not overlapped with each other, and then, the bundled circles are packed, although this calculation could not be conventionally carried out. However, when this packing calculation method calculates such an inclusive circle with respect to a plurality of circles whose dimensions are different from each other, there are some cases that a total calculation time is prolonged, depending upon initial arrangements of these plural circles having the different dimensions. In other words, in the packing calculations for wire harness, or the like, which is constituted by a plurality of wires having different diameters, there are some cases that a total packing calculation time is prolonged.

SUMMARY OF THE INVENTION

The present invention has been made to solve the above-described problem, and therefore, has an object to provide a wire packing calculating method and a wire packing calculation apparatus, capable of largely shortening packing calculation time of a wire harness which is constituted by a plurality of wires having different diameters, while a simple processing operation is merely added to the process sequences described in Japanese Patent Application No. 2003-179718.

In order to achieve the above object, according to the present invention, there is provided a calculation method for packing a plurality of wires constituting a wire harness, in which sectional shapes of the plurality of wires are regarded as a plurality of circles having diameters corresponding to the respective outer shapes of the wires, the calculation method, comprising the steps of:

removing a first circle, which is smaller than a predetermined value, from the plurality of circles in accordance with a predetermined reference;

forming a primary inclusive circle as small as possible in which a plurality of second circles, which are rest circles removed the first circle from the plurality of circles, are included in the primary inclusive circle so as not to be overlapped with each other;

calculating first position information regarding a position of the primary inclusive circle and the second circles included in the primary inclusive circle;

forming a final inclusive circle as small as possible in which the first circle is arranged in the primary inclusive circle while the second circles are fixed in the primary inclusive circle in accordance with the first position information such that the first circle and the second circles are not overlapped with each other;

calculating second position information regarding a position of the final inclusive circle; and outputting the second position information, wherein:

the primary inclusive circle forming step and the final inclusive circle forming step respectively includes the steps of:

supposing an inclusive circle which includes the plurality of circles arranged such that the plural circles are not overlapped with each other on a plane;

defining a target circle which has the same center as that of the inclusive circle, the target circle being smaller than the inclusive circle, and at least one of the circles being deviated from the target circle;

seeking a position where the plurality of circles other than an insertion trail circle are arranged as far as possible from the insertion trial circle within the target circle without being overlapped with each other, while the circle deviated from the target circle is defined as the insertion trial circle;

inserting the insertion trial circle into a space within the target circle, the space being generated by changing the arrangement of the plural circles based on a seek result of the seeking step;

defining a new target circle which is slightly smaller than the target circle and contains the insertion trial circle when an entire portion of the insertion trial circle is inserted within the target circle, and returning to the seeking step; and repeating the target circle defining step, the seeking step, the inserting step, and the new target circle defining step for gradually decreasing the inclusive circle.

Preferably, in the second position information calculating step, third position information regarding positions of the first and second circles included in the final inclusive circle is further calculated; and in the output step, the third position information is further outputted.

Preferably, in the final inclusive circle forming step, the first circle is arranged in the primary inclusive circle so as to be close to a center of the primary inclusive circle as close as possible without overlapping the first and second circles with each other.

Preferably, the calculation method further comprises the step of: simply forming a primary inclusive circle in which the plurality of second circles are included in the primary inclusive circle, in a state that the second circles are contacted with each other without being overlapped with each other, when a total number of the second circles is smaller than or equal to 3, instead of the primary inclusive circle forming step.

Preferably, the calculation method further comprises the step of: determining the primary inclusive circle as the final inclusive circle instead of the final inclusive circle forming step, in a case that the first circle is included in the primary inclusive circle such that the first and second circles are not overlapped with each other in either the primary inclusive circle forming step or the primary inclusive circle simple forming step.

Preferably, the predetermined reference is determined based on respective diameters of the plurality of wires which are generally used as wires for constituting the wire harness.

Preferably, the predetermined reference is relatively determined based on respective diameters of the plurality of wires.

Preferably, in the seeking step, a circle Voronoi diagram is formed by the target circle and a circle group made by the insertion trial circle and the plurality of circles from which one circle is removed, and a position is sought where the plurality of circles other than the insertion trial circle are allowed to be moved within the target circle by checking as to whether or not a center of the one circle, which is contacted to both-sided circles for forming the respective boundary edges in the circle Voronoi diagram, is present on the boundary edge with respect to the plurality of circles other than the insertion trial circle.

Preferably, the calculation method further comprises the step of defining a next target circle which has an intermediate size between the size of the inclusive circle and the size of the present target circle and contains the insertion trial circle when the insertion trial circle cannot be inserted in the repeating step, and returns to the seek step.

According to the present invention, as shown in FIG. 1, there is also provided a calculation apparatus for packing a plurality of wires constituting a wire harness, in which sectional shapes of the plurality of wires are regarded as a plurality of circles having diameters corresponding to the respective outer shapes of the wires, the calculation apparatus, comprising:

a small circle removing unit 3A removing a first circle, which is smaller than a predetermined value, from the plurality of circles in accordance with a predetermined reference;

a primary inclusive circle calculating unit 3B forming a primary inclusive circle as small as possible in which a plurality of second circles, which are rest circles removed the first circle from the plurality of circles, are included in the primary inclusive circle so as not to be overlapped with each other;

a first position information calculating unit calculating first position information regarding a position of the primary inclusive circle and the second circles included in the primary inclusive circle;

a final inclusive circle calculating unit 3D forming a final inclusive circle as small as possible in which the first circle is arranged in the primary inclusive circle while the second circles are fixed in the primary inclusive circle in accordance with the position information such that the first circle and the second circles are not overlapped with each other;

a second position information calculating unit calculating second position information regarding a position of the final inclusive circle; and output unit 3F outputting the second position information, wherein:

the primary inclusive circle forming unit and the final inclusive circle forming unit respectively includes:

an inclusive circle supposing unit supposing an inclusive circle which includes the plurality of circles arranged in such a manner that the plural circles are not overlapped with each other on a plane;

a target circle defining unit defining a target circle which has the same center as that of the inclusive circle, the target circle being slightly smaller than the inclusive circle, and at least one of the circles being deviated from the target circle;

a position seeking unit seeking a position where the plurality of circles other than an insertion trail circle are arranged as far as possible from the insertion trial circle within the target circle without being overlapped with each other, while the circle deviated from the target circle is defined as the insertion trial circle;

an insertion trial circle inserting unit inserting the insertion trial circle into a space within the target circle, the space being formed by changing the arrangement of the plural circles based on a seek result of the seeking unit; and a new target circle defining unit defining a new target circle which is slightly smaller than the target circle and contains the insertion trial circle when an entire portion of the insertion trial circle is inserted within the target circle and returning to a procedure of the seeking unit, and procedures of the target circle defining unit, the seeking unit, the inserting unit, and the new target circle defining unit are repeated for gradually decreasing the inclusive circle.

Preferably, the calculation apparatus further comprises a primary inclusive circle simply calculating unit 3C simply forming a primary inclusive circle in which the plurality of second circles are included in the primary inclusive circle in a state that the second circles are contacted with each other without being overlapped with each other, when a total number of the second circles is smaller than or equal to 3, instead of the primary inclusive circle forming unit.

Preferably, the calculation apparatus, further comprises a primary inclusive circle simple calculating unit 3E determining the primary inclusive circle as the final inclusive circle when the first circle is included in the primary inclusive circle such that the first and second circles are not overlapped with each other in either the primary inclusive circle forming step or the primary inclusive circle simple forming step, instead of the final inclusive circle forming unit.

In the above methods and configurations, the inclusive circle is acquired as the primary inclusive circle when the group of circles which can be regarded as the first circles and constitute the calculation subject is once removed based upon the predetermined reference, and thereafter, the plurality of second circles corresponding to the circle group left after the removal are bundled to make the circular shape as small as possible in such a manner that these second circles are not overlapped with each other, and then, the bundled second circles are packed. Also, the information as to the position of this primary inclusive circle and the information as to the positions of the plural second circles which constitute this primary inclusive circle are calculated. Subsequently, the inclusive circle is acquired as the final inclusive circle when the plurality of second circles are fixed based upon the above-explained information related to the positions. The plurality of circles which are constituted by adding the once removed first circles to the fixed second circles are bundled to made the circular shape as small as possible in such a manner that these plural circles are not overlapped with each other, and then, the bundled circles are packed. Also, the information as to the position of this final inclusive circle and/or the information as to the positions of the plural circles which constitute this final inclusive circle are calculated. Then, the information as to the position of this final inclusive circle and/or the information as to the positions of the plural circles are outputted. In particular, in the calculations as to the primary inclusive circle and the final inclusive circle, since the target circle defining step (unit), the seeking step (unit), the inserting step (unit), the new target circle defining step (unit) are repeatedly carried out, the inclusive circle is gradually decreased, so that a packing inclusive circle may be effectively acquired, and further, information related to a position of this packing inclusive circle and/or information related to the positions of the plural circles may be calculated.

Also, while the plurality of second circles are fixed based upon the information related to the position acquired in the primary inclusive circle calculating step, first of all, the first circles which have been once removed are arranged in such a manner that the first circles are not overlapped with each other and are located in close vicinity of the center of the primary inclusive circle as close as possible. Then, the process operation is advanced to the subsequent process operation.

Also, in the case that a total number of the second circles is smaller than, or equal to 3, instead of the above-described repetition process operation, the inclusive circle is acquired as the primary inclusive circle when said plurality of second circles are bundled in such a manner that the plural second circles are contacted to each other and the bundled second circles are packed; and also, the calculation is made of both the information related to the position of the primary inclusive circle and the information related to the positions of the plurality of second circles which constitute the primary inclusive circle.

Also, in such a case that all of the first circles which have been once removed are stored into the primary inclusive circle in such a manner that all of the first circles are not overlapped with each other, instead of the repetition process operations, the primary inclusive circle which has already been acquired is defined as the final inclusive circle, the calculation is made of the information related to the position of the final inclusive circle, and the information related to the positions of the plurality of circles which constitute the final inclusive circle.

Also, since the predetermined reference is determined based upon the respective diameters of the plurality of wires which are generally used as the wires for constituting the wire harness, the reference can be easily determined, and furthermore, the packing calculation of the wire harness adapted to the actual case can be carried out within a short time.

Also, the reference of the first circle removing operation is relatively determined based upon the respective diameters of the plurality of wires which are used to be calculated. As a result, the packing calculation can be carried out by considering not only the existing wires, but also such wires which are not presently available, but may be used in a future. In other words, while the higher general-purpose characteristic is maintained, the packing calculation of the wire harness can be carried out in a short time.

Also, since the circle Voronoi diagram is utilized, the move candidate position of the insertion trial circle can be sought in a very simple manner.

Also, the next target circle defining step is further comprised in which in the case that the insertion trial circle cannot be inserted, another target circle is defined which owns the intermediate size between the size of the inclusive circle and the size of the present target circle and also contains the insertion trial circle, and thereafter, the second seek control step is returned to the seek step. As a result, both the positional information as to the respective inclusive circles and the positional information as to the wires which constitute are inclusive circle can be acquired in a higher efficiency.

In accordance with the above methods and configurations, the group of such circles which may be regarded as the first circles is once removed from a plurality of circles, the primary inclusive circle is acquired by employing only the second circles by executing the inclusive circle calculating process operation, and thereafter, the first circles which have been once removed are added to this primary inclusive circle so as to calculate the final inclusive circle, so that the calculation amount for acquiring both the primary inclusive circle and the final inclusive circle can be largely reduced in which the target circle defining step (unit), the seeking step (unit), the inserting step (unit), and the new target circle defining step (unit) are repeatedly carried out. As a consequence, the time required to acquire the final inclusive circle from the initial condition in which the circles corresponding to a plurality of wires having the different diameters have been arbitrarily arranged can be shortened, namely, the packing calculation time of the wire harness can be largely shortened.

Also, while the plurality of second circles are fixed based upon the information related to the position acquired in the primary inclusive circle calculating step, first of all, the first circles which have been once removed are arranged in such a manner that the first circles are not overlapped with each other and are located in close vicinity of the center of the primary inclusive circle as close as possible. Then, the process operation is advanced to the subsequent process operation. As a result, the packing calculation time of the wire harness can be further shortened.

Also, in the case that a total number of the second circles is smaller than, or equal to 3, instead of the above-described repetition process operation, the calculation is made of both the information related to the position of the primary inclusive circle and the information related to the positions of the plurality of second circles which constitute the primary inclusive circle by executing the simpler process operation. As a consequence, the time required for acquiring the primary inclusive circle, namely, the packing calculation time of the wire harness can be finally and further shortened.

Also, in such a case that all of the first circles which have been once removed are stored into the primary inclusive circle in such a manner that all of the first circles are not overlapped with each other, instead of the repetition process operations, the primary inclusive circle which has already been acquired is defined as the final inclusive circle, the calculation is made of the information related to the position of the final inclusive circle, and the information related to the positions of the plurality of circles which constitute the final inclusive circle. As a consequence, the time required for acquiring the final, inclusive circle, namely, the packing calculation time of the wire harness can be further shortened.

Also, since the predetermined reference is determined based upon the respective diameters of the plurality of wires which are generally used as the wires for constituting the wire harness, the reference can be easily determined, and furthermore, the packing calculation of the wire harness adapted to the actual case can be carried out within a short time.

Also, the reference of the first circle removing operation is relatively determined based upon the respective diameters of the plurality of wires which are used to be calculated. As a result, the packing calculation can be carried out by considering not only the existing wires, but also such wires which are not presently available, but may be used in a future. In other words, while the higher general-purpose characteristic is maintained, the packing calculation of the wire harness can be carried out in a short time.

Also, since the circle Voronoi diagram is utilized, the move candidate position of the insertion trial circle can be sought in a very simple manner. As a consequence, the positional information as to the respective inclusive circles and also the wires which constitute the inclusive circles can be acquired in a short time. Finally, the packing calculation time of the wire harness can be further shortened.

Also, the second seek control step is further comprised in which in the case that the insertion trial circle cannot be inserted, another target circle is defined which owns the intermediate size between the size of the inclusive circle and the size of the present target circle and also contains the insertion trial circle, and thereafter, the second seek control step is returned to the seek step. As a result, both the positional information as to the respective inclusive circles and the positional information as to the wires which constitute are inclusive circle can be acquired in a higher efficiency. Finally, the packing calculation time of the wire harness can be furthermore shortened.

BRIEF DESCRIPTION OF THE DRAWINGS

The above objects and advantages of the present invention will become more apparent by describing in detail preferred exemplary embodiments thereof with reference to the accompanying drawings, wherein:

FIG. 3 is a flow chart for showing a basic process sequence related to an embodiment of the calculation method of the present invention;

FIGS. 6A and 6B are diagrams for indicating an example as to both an initial arrangement table and a final arrangement table;

FIG. 10 is a flow chart for showing a first seek process operation;

FIG. 11 is a flow chart for indicating a second seek process operation;

DETAILED DESCRIPTION OF THE PREFERRED EMBODIMENTS

Figure 1:
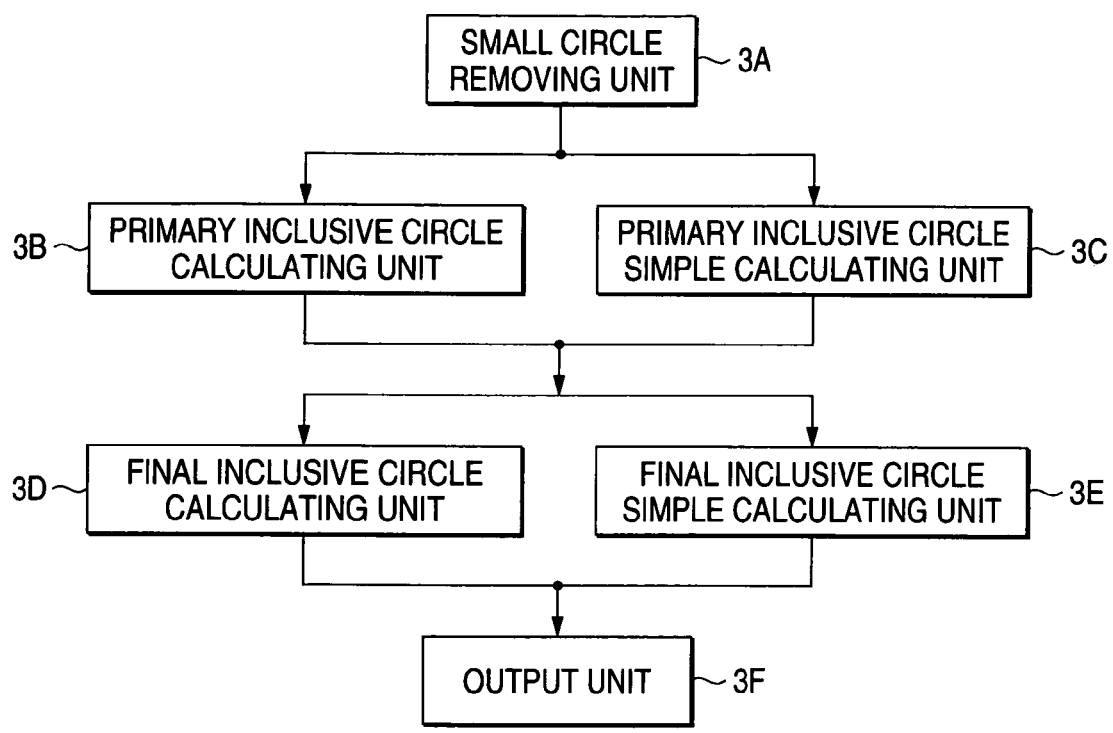
FIG. 1 is a block diagram for indicating a basic structure of the present invention.
Figure 2:
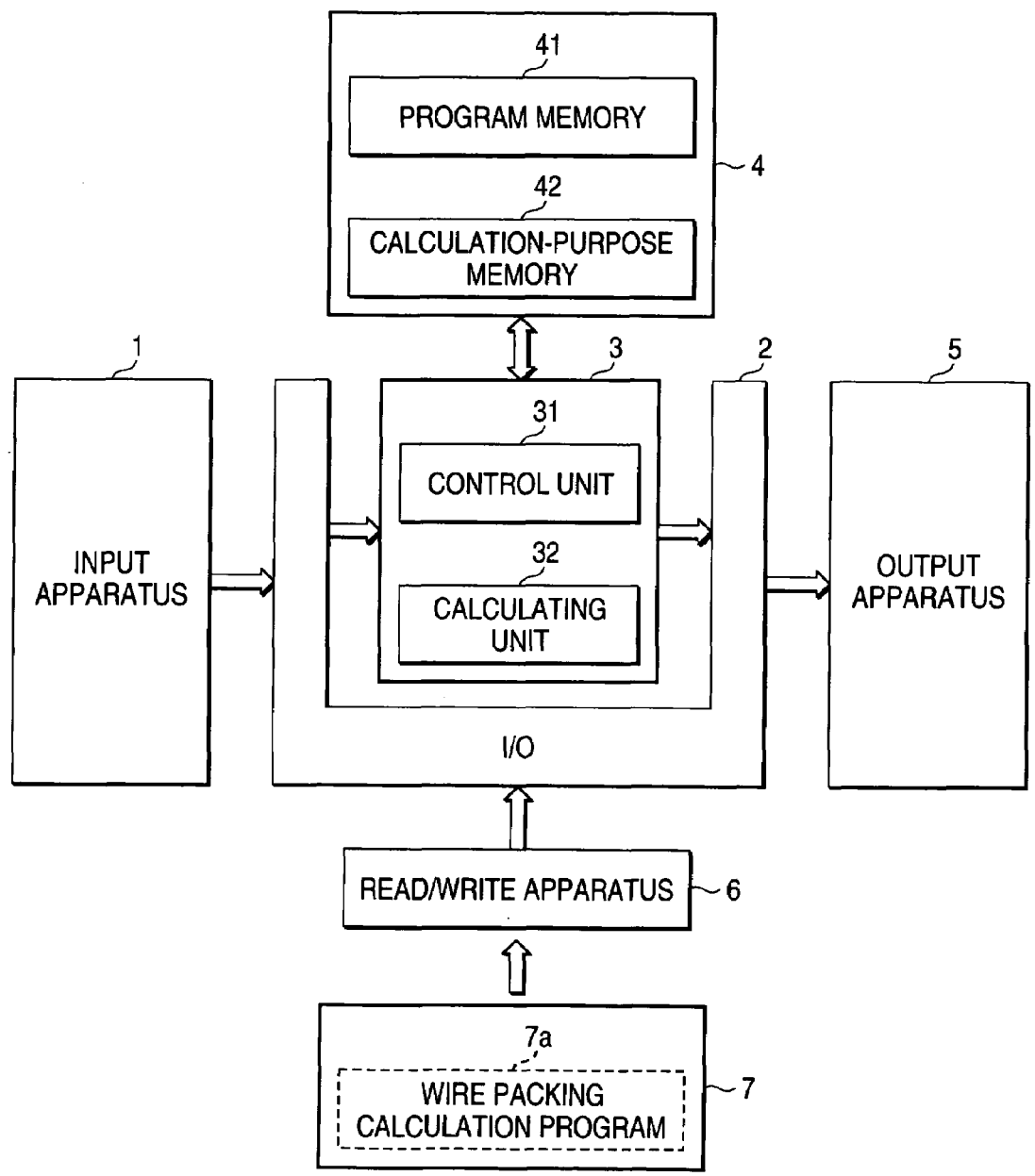
FIG. 2 is a block diagram for indicating a hardware structure used to realize both a calculation method and a calculation apparatus of the present invention.

Referring now to drawings, embodiments of the present invention will be described. First, a description is made of a hardware structure used to realize a wire packing calculation method according to an embodiment of the present invention with reference to FIG. 2. FIG. 2 is a block diagram for representing an example of the hardware structure used to realize a wire packing calculation method and a wire packing calculation apparatus, according to the present invention.

As indicated in FIG. 2, this hardware structure is realized by a personal computer which is known in the technical field, a general-purpose computer, or the like. This computer is arranged by containing an input apparatus 1, an I/O (input/output interface circuit) 2, a CPU (Central Processing Unit) 3, a memory 4, an output apparatus 5, and a read/write apparatus 6. The input apparatus 1, the memory 4, the output apparatus 5, and the read/write apparatus 6 are electrically connected via the I/O 2 and the like to the CPU 3.

The input apparatus 1 corresponds to, for example, a keyboard, or a mouse device which is employed so as to enter input data in the below-mentioned process operation. The CPU 3 contains a control unit 31 and a calculation unit 32. The control unit 31 controls the input apparatus 1, the output apparatus 5, and the like. The calculation unit 32 executes a process operation related to the wire packing calculation method (explained later) in accordance with a program stored in the memory 4.

The memory 4 contains a program memory 41, and a calculation-purpose memory 42. The program memory 41 stores therein programs and the like, which correspond to the respective process operations related to this wire packing calculation method (discussed later). Work areas provided for various sorts of process operations have been allocated in the calculation-purpose memory 42. Then, the output apparatus 5 corresponds to, for instance, a monitor display, or a printing apparatus, which outputs a result of process operation executed by the CPU 3.

The read/write apparatus 6 corresponds to an apparatus which reads a wire packing calculation program 7a (for example, process sequential programs shown in FIG. 3, FIGS. 4A and 4B, FIG. 9, FIG. 10, and FIG. 11 and explained later), which is stored in a recording medium 7 such as a CD and a DVD, and then, transfers this read wire packing calculation program 7a to the above-explained program memory 41. Also, the read/write apparatus 6 performs a function capable of writing a calculation result into the recording medium 7. A communication interface such as a modem board and a LAN card may be alternatively employed in this computer.

The CPU 3 installs the wire packing calculation program 7a which has been read in the read/write apparatus 6 to the program memory 41 of the memory 4. Then, after the power supply is turned ON, this installed calculation program 7a is initiated, and thus, this computer functions as the wire packing calculation apparatus. Alternatively, the wire packing calculation program 7a may also be installed in another personal computer having the above-described arrangement, and a general-purpose computer having the above-explained arrangement. After the wire packing calculation program 7a is installed, this installed computer may function as a wire packing calculation apparatus.

The wire packing calculation program 7a is stored in the recording medium 7. The wire packing calculation program 7a may be provided from not only the recording medium 7 such as a CD and a DVD in this computer, but also may be provided in this computer via the Internet, or a communication line such as a leased line and a LAN.

Next, a description is made of a basic process sequence according to an embodiment of the present invention with reference to FIG. 3 to FIGS. 6A and 6B. FIG. 3 is a flow chart for explaining the basic process sequence related to one embodiment of the wire packing calculation method of the present invention. FIG. 4A and FIG. 4B are flow charts for describing an example of a small circle removing process operation of FIG. 3. FIG. 5A to FIG. 5D are diagrams for representing behavior of respective circles in accordance with the process sequence of FIG. 3. FIGS. 6A and 6B are diagrams for showing an example of an initial arrangement table and an example of a final arrangement table, respectively.

In this wire packing calculation method, it is so assumed that sectional shapes of a plurality of wires which constitute wire harness are a plurality of circles having diameters which correspond to outer shapes of these sectional shapes. It is also assumed that wire harness is constituted by a plurality of wires having different diameters. In this connection, sorts of diameters of wires which constitute the wire harness may be arbitrarily defined. In this example, as indicated in FIG. 5A and so on, it is so assumed that the wire harness is constituted by a plurality of wide wires expressed by circles "c1", "c2", "c3", and also constituted by a plurality of narrow wires expressed by circles "c4", "c5", "c6", . . . , "cn."

Figure 5A:
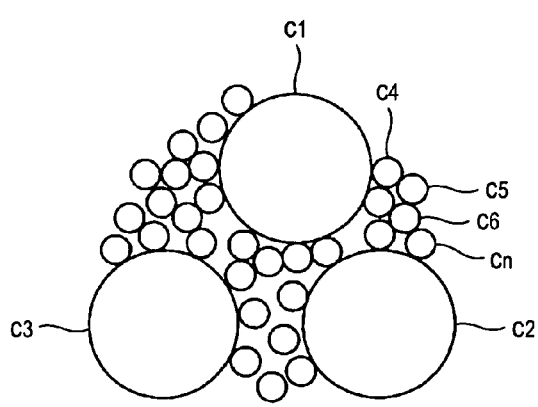
FIG. 5A to FIG. 5D are diagrams for showing behavior of the respective circles according to the process sequence of FIG. 3.

The respective circles corresponding to a plurality of wires which constitute the wire harness are initially arranged at random within a predetermined range as represented in, for example, FIG. 5A. In this wire packing calculation method, firstly, both an initial arrangement diagram and an initial arrangement table are outputted by the output apparatus 5 in a step T1 shown in FIG. 3. Alternatively, both the initial arrangement diagram and the initial arrangement table may be displayed not only on the monitor display, but also may be printed out. In the initial arrangement diagram, the respective circles, c1, c2, c3, c4, c5, c6, . . . , cn, which correspond to a plurality of wires are indicated by way of such an image shown in FIG. 5A. Although not shown in the drawing, electric wire IDs which have been previously allocated so as to specify electric wires have also been added to the respective circles "ci (symbol "i" is equal to 1, 2, 3, . . . , n)."

Also, in the initial arrangement table, as shown in FIG. 6A, positional information corresponding to "n" pieces of circles "ci" of FIG. 5A is indicated in a table form. The initial arrangement table includes, for instance, the electric wire IDs; electric wire center positions (x1, y1), (x2, y2), (x3, y3), (x4, y4), (x5, y5), . . . , of the respective circles "ci"; electric wire radii r1, r2, . . . , and the like.

In a next step T2, a small circle removing process operation is carried out. In this small circle removing process operation, such a circle group is once removed, while this circle group can be assumed as the small circles from a plurality of circles "ci" based upon a predetermined reference. Precisely speaking, for instance, as indicated in a small circle removing process operation of FIG. 4A, a size (dimension) of each of the circles "ci" is compared with a size (dimension) of a reference circle "cr" (step P1). When it is so judged that the size of each circle of the circles "ci" is larger than the size of the reference circle "cr" ("Y" in step P1), the relevant circle "ci" is assumed as a large circle (step P2). To the contrary, when it is so judged that the size of each circle of the circles "ci" is smaller than the size of the reference circle "cr" ("N" in step P1), the relevant circle "ci" is assumed as a small circle (step P3). Then, this small circle is removed (step P4).

The above-described size of the reference circle "cr" has been determined based upon diameters of a plurality of wires which have been generally used as wires which constitute wire harness. For instance, assuming now that an averaged value as to radii of a plurality of wires which are generally used is approximately 2 mm, the size (radius) of the reference circle "cr" is defined as 4 mm. If such a definition is employed, then the reference circle can be readily determined, and furthermore, such a packing calculation as to the wire harness can be carried out which is adapted to an actual case.

Figure 4A:
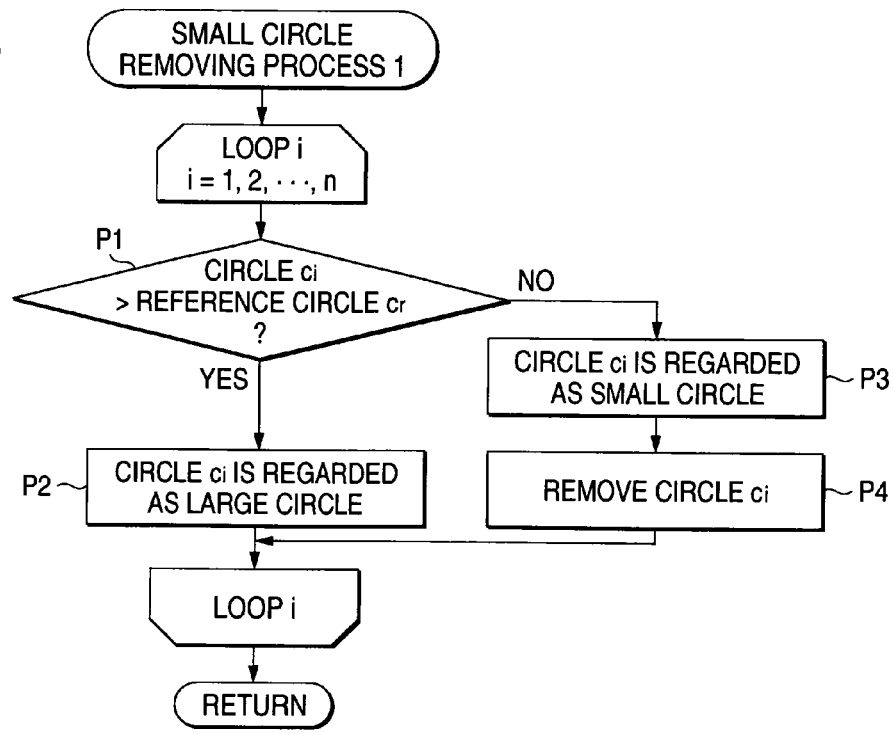
FIG. 4A and FIG. 4B are flow charts for representing an example of the small circle removing process operation of FIG. 3.
Figure 4B:
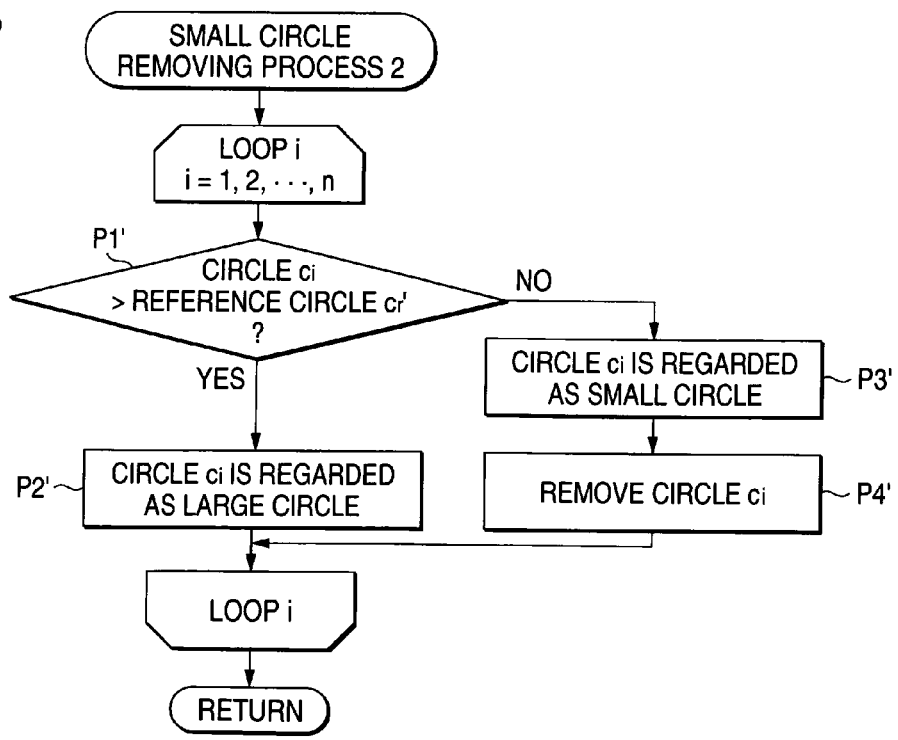

The small circle removing process operation defined in the step T2 may be replaced by such a process sequential operation as shown in FIG. 4B. That is, as indicated in a small circle removing process operation 2 of FIG. 4B, the size of each of the circles "ci" is compared with a size (dimension) of another reference circle "cr'" (step P1'). When it is so judged that the size of each circle of the circles "ci" is larger than the size of this reference circuit "cr'" ("Y" in step P1'), the relevant circle "ci" is assumed as a large circle (step P2'). To the contrary, when it is so judged that the size of each circle of the circles "ci" is smaller than the size of this reference circuit "cr'" ("N" in step P1'), the relevant circle "ci" is assumed as a small circle (step P3'). Then, this small circuit is removed (step P4'). It should also be noted that the step T2 corresponds to both a small circle removing step and a small circle remover.

The size of the above-described reference circle "cr'" has been relatively determined based upon the respective diameters of the plural wires which should be calculated in the wire packing calculation method. For example, in the case that 5 sorts of diameters of wires are present as the plural wires which should be calculated, a size of a circle corresponding to the wire having the second largest diameter is determined as the size of the reference circle "cr'." When this size determination is employed, a packing calculation may be carried out by also considering such a wire which is planed to be used in a future, although this wire is not actually present. In other words, general-purpose characteristics of this packing calculation may be increased.

Since such a small circle removing process operation is carried out, the circles $c4, c5, c6, \ldots,$ cn among these circles of FIG. 5A are removed; which are assumed as the small circles. Eventually, the circles $c1, c2, c3$ other than the above-removed circles are left. It should also be noted that a plurality of circles corresponding to the circle group left after the small circles have been removed will be referred to as "large circles."

Next, in a step T3, a judgment is made as to whether or not positions of the large circles $c1, c2, c3$ can be easily designated. As a supplementary explanation, this judgment is assumed to check whether or not a total number of these large circles is smaller than, or equal to, for example, 3. In other words, in the case that a total number of the large circles is smaller than, or equal to 3, a primary inclusive circle (explained later) may be specified by merely arranging these large circles in such a manner that these large circles are made in contact to each other. In the step T3, when it is so judged that the positions of the large circles can be designated ("Y" in step T3), the process operation is advanced to a step T5. To the contrary, when it is so judged that the positions of the large circles cannot be designated ("N" in step T3), the process operation is advanced to a step T4.

In the step T4, a primary inclusive circle calculating process operation is carried out. A detailed explanation as to the primary inclusive circle calculating process operation will be made in connection with FIG. 7 and succeeding drawings. Briefly speaking, in this primary inclusive circle calculating process operation, such an inclusive circle is acquired as the primary inclusive circle when a plurality of large circles are bundled to make a circular shape as small as possible in such a manner that these large circles are not overlapped with each other, and then, the bundled wires are packed. Furthermore, information related to both a position of this primary inclusive circle, and positions of the plural large circles which constitute this primary inclusive circle is acquired, for instance, coordinates of center positions and radii are calculated. It should be noted that the step T4 corresponds to a primary inclusive circle calculation step and a primary inclusive circle calculator.

Figure 5B:
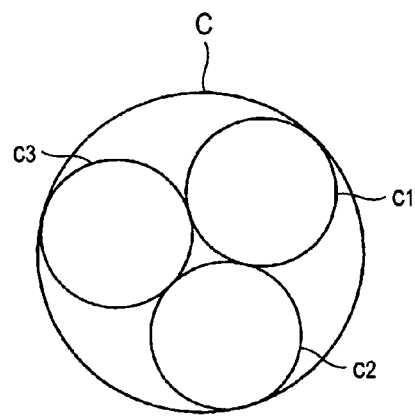

On the other hand, in the step T5, a primary inclusive circle simple calculating process operation is carried out. In this primary inclusive circle simple calculating process operation, as shown in FIG. 5B, such an inclusive circle "C" is acquired as the primary inclusive circle when a plurality of large circles $c1, c2, c3$ are bundled in such a manner that these large circles are made in contact to each other, and then, the bundled circles are packed. Furthermore, information related to both a position of this primary inclusive circle, and positions of the plural large circles $c1, c2, c3$ which constitute this primary inclusive circle is acquired, for instance, coordinates of center positions and radii are calculated. It should be noted that the step T5 corresponds to the primary inclusive circle calculation step and the primary inclusive circle calculator.

As previously explained, in such a case that a total number of these plural large circles is smaller than, or equal to 3, the calculation is carried out as to the information related to both the primary inclusive circle and the plural large circles which constitute the primary inclusive circle by way of the above-explained primary inclusive circle simple calculating process operation instead of the inclusive circle process operation of the step T4. As a result, time required to acquire the primary inclusive circle, in other words, eventually, the packing calculation time of the wire harness can be further shortened.

Next, in a step T6, based upon the information related to the positions which has been acquired in either the step T4 or the step T5, both the primary inclusive circle and a plurality of large circles which constitute this primary inclusive circle are arranged in a manner as indicated in FIG. 5B. FIG. 5B indicates an arranging example of both the 3 large circles and the primary inclusive circle thereof in the case that the calculating process operation is carried out via the step T5. In such a case that the calculating process operation is carried out via the step T4, four, or more large circles are bundled to make a circular shape as small as possible in a similar manner to FIG. 5B.

Figure 5C:
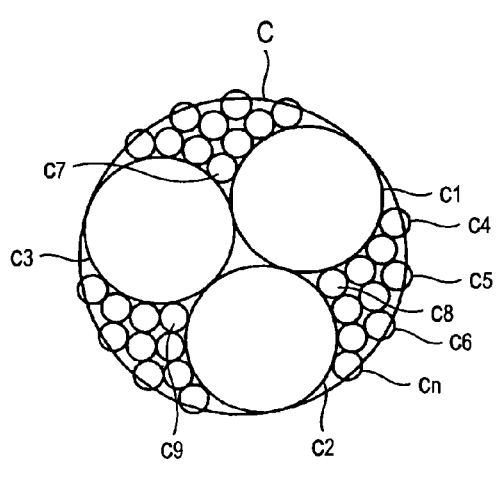

Next, in a step T7, a simple inserting trial of a small circle is carried out with respect to the primary inclusive circle "C" which has been calculated in the above-described manner. Circles which are tried to be inserted correspond to the small circles $c4, c5, c6, \ldots,$ cn which have been removed in the above-explained step T2. In this case, the arrangement of the large circles $c1, c2, c3$ remains fixed, which have already been calculated. This simple inserting trial is realized by merely rearranging the small circles in such a manner that, for example, the small circles are simply rearranged so as to contact the large circles $c1, c2, c3$ to each other. As shown in FIG. 5C, in such a case that the large circles $c1, c2, c3$ are arranged and only the small circles $c7, c8, c9$ are present, these small circles $c7, c8, c9$ may be readily inserted into the primary inclusive circle "C."

Next, in a step T8, a judgment is made as to whether or not the above-described inserting trial can succeed, namely whether or not any of the small circles $c4, c5, c6, \ldots,$ cn is deviated from the primary inclusive circle "C." In this step T8, when it is so judged that the inserting trial can succeed (namely, none of circles is deviated) ("Y" in step T8), the process operation is advanced to a step T10. To the contrary, when it is so judged that the inserting trial cannot succeed (namely, any of circles is deviated) ("N" in step T8), the process operation is advanced to a step T9.

In the step T9, a final inclusive circle calculating process operation is carried out. Basically, the final inclusive circle calculating process operation is similar to the above-described primary final inclusive circle calculating process operation. A detailed explanation will be made of the final inclusive circle calculating process operation with reference to FIG. 7 and the succeeding drawings. Briefly speaking, in this final inclusive circle calculating process operation, while the arrangement of the large circles $c1, c2, c3$ which have already been acquired is fixed, such an inclusive circle is acquired as a final inclusive circle when a plurality of circles which are arranged by adding the small circles $c4, c5, c6, \ldots,$ cn, which have been once removed to the above-described arrangement are bundled to make a circular shape as small as possible in such a manner that these large and small circles are not overlapped with each other, and then, the bundled circles are packed. Further, a calculation is made of information as to positions of both this acquired final inclusive circle and a plurality of these circles which constitute the acquired final inclusive circle. It should also be understood that as an initial arrangement example of the respective circles which are applied to the final inclusive circle calculating process operation with reference to FIG. 7 and the succeeding drawings, such an arrangement is preferably employed. That is, while the arrangement of the large circles c1, c2, c3 which have been already acquired is fixed, the small circles c4, c5, c6, ..., cn which have been once removed are arranged in the above-described arrangement in such a manner that these small circles are not overlapped with each other and are arranged as close as possible around the primary inclusive circle as a center. The step T9 corresponds to a final inclusive circle calculation step and a final inclusive circle calculator.

On the other hand, in a step T10, a final inclusive circle simple calculating process operation is carried out. As previously explained, in the final inclusive circle simple calculating process operation, in such a case that the small circles c7, c8, c9 can be easily inserted into the primary inclusive circle "C", such a primary inclusive circle "C" which has already been acquired directly constitutes the final inclusive circle. In other words, in this final inclusive circle simple calculating process operation, while the primary inclusive circle is set as the final inclusive circle, a calculation is made of information related to both this set final inclusive circle, and a plurality of small circles which have been inserted into this final inclusive circle and constitute this final inclusive circle. It should also be noted that the step T10 corresponds to both a final inclusive circle calculation step and a final inclusive circle calculator.

As explained above, in such a case that all of the small circles which have been once removed may be stored in the primary inclusive circle in such a manner that all of these small circles are not overlapped with each other, instead of the above-described inclusive circle processing operation defined in the step T9, while the primary inclusive circle which has already been acquired is set as the final inclusive circle, the calculation is made of information related to both this set final inclusive circle, and a plurality of small circles which constitute this final inclusive circle. As a result, time required to acquire the final inclusive circle can be further reduced, namely, the packing calculation time of the wire harness can be further shortened.

Figure 5D:
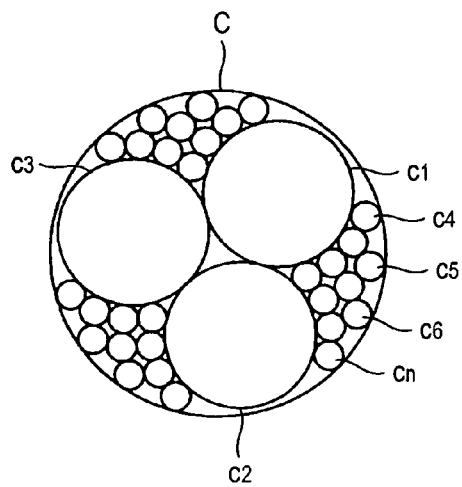

Based upon the information as to both the final inclusive circle and the small circles which constitute this final inclusive circle, which has been calculated in the above-explained manner, both a final arrangement diagram and a final arrangement table are outputted from the output apparatus 5 in a step T11. Both the final arrangement diagram and the final arrangement table may be displayed not only on the monitor display, but also may be printed out. The final arrangement diagram corresponds to such an image as shown in FIG. 5D, in which the respective circles c1, c2, c3, c4, c5, c6, ..., cn, corresponding to a plurality of wires are displayed. Although not shown in the drawing, electric wire IDs which have been previously allocated so as to specify electric wires are also added to the respective circles "ci" (symbol "i" is equal to 1, 2, 3, ..., n). It should also be noted that the step T11 corresponds to both an output step and an output unit.

Also, as shown in FIG. 6B, in the final arrangement table, positional information corresponding to "n" pieces of circles "ci" shown in FIG. 5D is indicated in the table format. The initial arrangement table contains, for example, the electric wire IDs; electric wire center positions (x1', y1'), (x2', y2'), (x3', y3'), (x4', y4'), (x5', y5'), ..., which indicate coordinates of the center positions of the respective circles "ci"; and radii of the electric wires "r1", "r2", .... In addition, a radius "R1" of the final inclusive circle "C" is also indicated in the final arrangement table.

Figure 7:
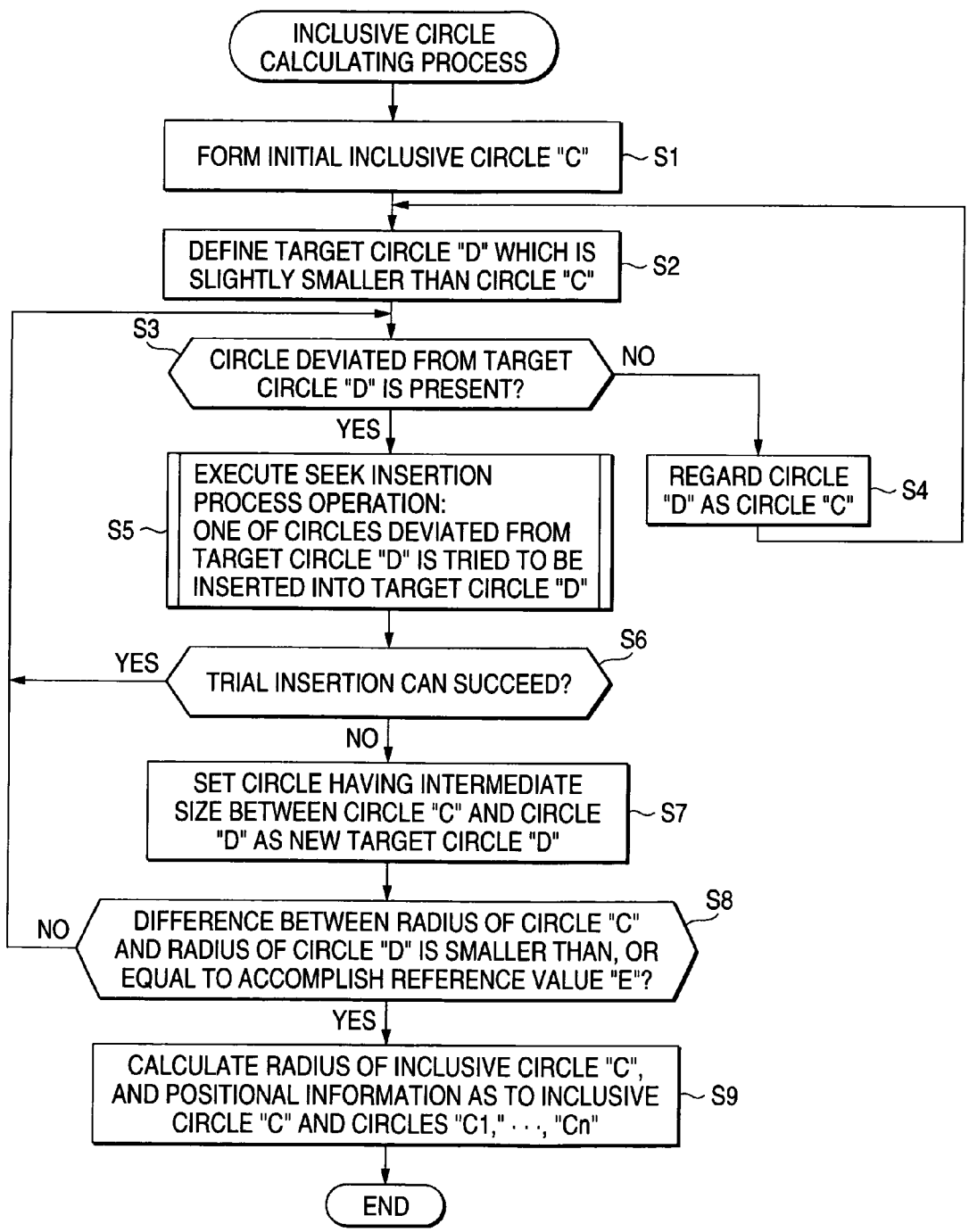
FIG. 7 is a flow chart for indicating a basic process sequence according to the inclusive circle calculating process operation.

Referring now to FIG. 7 to FIG. 12C, a detailed description is made of both the primary inclusive circle calculating process operation defined in the step T4 of FIG. 3, and the final inclusive circle calculating process operation defined in the step T9 thereof. As to the primary inclusive calculating process operation and the final inclusive calculating process operation, only circles to be handled and arrangements of these circles are different from each other. Therefore, both of these process operations can utilize calculating process operations described in a flow chart of FIG. 7. As a consequence, first of all, a basic process sequence of this inclusive circle calculating process operation will now be explained with reference to FIG. 7. That is, FIG. 7 is a flow chart for explaining the basic process sequence related to the inclusive circle calculating process operation.

This calculating process operation results in the following aspect. That is to say, assuming now that sectional shapes of a plurality of wires which constitute wire harness correspond to a plurality of circles having diameters corresponding to outer shapes of these plural wires, when "n" pieces of cylinders having these circles as sectional planes are bundled, a size (dimension) of a circle which surrounds the entire bundled cylinders is investigated. In an actual case, while the above-explained computer is employed, an effective calculation method is considered by which the plural wires are bundled to make a circular shape as small as possible, and then, the bundled wires are packed, and thus, an outer diameter of the packed wires is acquired. It should also be understood that in FIG. 7 to FIG. 12C, in order to understand this inclusive circle calculating process operation in a general-purpose manner, sizes, a total number, and arrangements of respective circles "ci" are slightly changed from those of the respective circles "ci" shown in FIGS. 5A to 5D.

In the basic process operation indicated in FIG. 7, the radii r1, r2, ..., rn of "n" pieces of circles c1, c2, ..., cn, a number "p", and an accomplish reference value "r" is given as input information. The radii r1, r2, ..., rn of "n" pieces of circles c1, c2, ..., cn, are correspond to the respective outer shapes of the sectional shapes of the plural wires such as the electric wires for constituting the wire harness. The number "p" is smaller than 1, but the number "p" is a sufficiently approximated to 1, for example, the number "P" is 0.95. The accomplish reference value r is sufficiently small plus number. For example, the accomplish reference value r=min (r1, r2, ..., rn)/100).

Also, as output information, a diameter "R" of a circle made as small as possible which packs thereinto "n" pieces of circles c1, c2, ..., cn, in such a manner that these circles are not overlapped with each other, and also, positional information as to a circle C, and the circles c1, c2, ..., cn, at this time are outputted.

To this end, in a step S1 shown in the flow chart of FIG. 7, first of all, these circles c1, c2, ..., cn, are arranged on a plane in such a manner that these circles are not overlapped with each other. Then, a large circle which surrounds these circles c1, c2, ..., cn, namely, an inclusive circle "C" is found out.

Next, in a step S2, a step S3, and a step S4, such a circle which owns the same center as that of the above-explained inclusive circle "C", and has a radius which is "p" times larger than the radius of the inclusive circle "C" is determined. Namely, a target circle "D" is determined. In other words, in a loop constituted by the step S2, "N" is the step S3, and the step S4, such a target circle "D" is determined which owns the same center as that of the inclusive circle "C", and which is slightly smaller than this inclusive circle "C", and furthermore, at least any one of the plural circles c1, c2, . . . , cn, is deviated from this inclusive circle "C." It should also be noted that in the below-mentioned process steps, the arrangement is changed in such a manner that the circles c1, c2, . . . , cn, are entered into the target circle "D."

Next, in a step S5, a seek insertion process operation is carried out. In other words, in this seek insertion process operation, circles other than an arbitrary one circle "ci" are derived in the order of long distances from this arbitrary one circle "ci" which is deviated from the target circle "D." When such derived circles can be positioned at further positions, these derived circles are moved to the further positions. In the case that the derived circles cannot be moved in the above-explained manner, these derived circles are left at the present positions. Then, this arbitrary circle "ci" is moved, namely is tried to be inserted into one of spaces formed by moving the above-explained circles. It should also be noted that the process operation of this step S5 will be additionally explained with reference to FIG. 9 to FIG. 12C.

Next, in a step S6, a judgment is made as to whether or not the inserting operation of the circle "ci" can succeed, the process operation is returned to the previous step S3 ("Y" in step S6). To the contrary, when it is so judged that the inserting operation of the circle "ci" cannot succeed, the process operation is advanced to a further step S7 ("N" in step S6). When the process operation is returned to the step S3, a check is made as to whether or not any other deviated circle is present. If YES, then the seek insertion process operation defined in the step S5 is again carried out with respect to the deviated circle. To the contrary, if NO, then the process operation is advanced to the step S4 in which a similar process operation to the above-process operation is carried out.

On the other hand, in the step S7, such a circle is newly determined as the target circle "D", while this circle has an intermediate size between the size of the above-described inclusive circle "C" and the above-explained target circle "D" where the insertion could not succeed. Next, in a step S8, a judgment is made as to whether or not a difference between the radius of the inclusive circle "C" and the radius of the target circle "D", which have been employed in the process operation defined in the above step S7, is smaller than, or equal to the above-described accomplish reference value "r." When this difference is larger than the accomplish reference value "r", the process operation is returned to the step S3 in which a similar process operation is repeatedly carried out ("N" in step S8). To the contrary, when this difference is smaller than, or equal to the accomplish reference value "r", the process operation is advanced to a step S9 ("Y" in step S8).

In the step S9, the radius of this inclusive circle "C" (corresponding to above-described inclusive circle) is calculated as the radius "R" of the wire harness. Also, positional information as to the inclusive circle "C" and positional information as to the respective circles c1, c2, . . . , cn are calculated. These calculation results are transferred and received so as to be processed in the step T6 shown in FIG. 3. Alternatively, the above-explained number "p" and the accomplish reference value "r" may be properly and slightly changed.

Figure 8A:
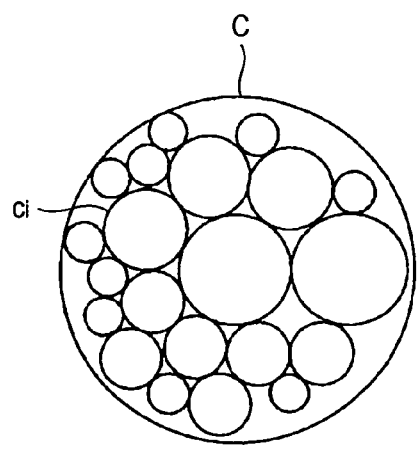
FIG. 8A shows an initial condition.
Figure 8B:
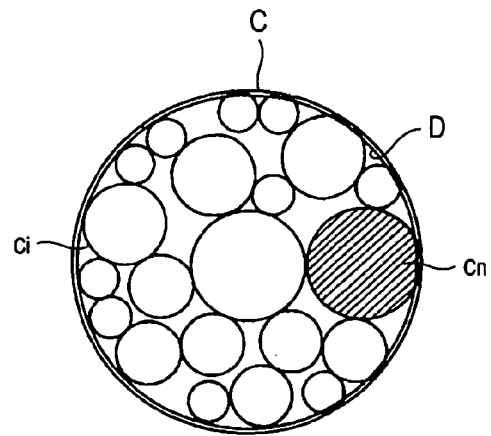
FIG. 8B indicates an insertion trial circle which is deviated from a target circle.
Figure 8C:
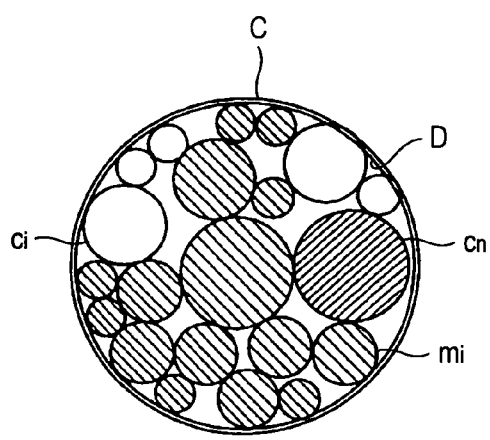
FIG. 8C represents a condition that the insertion trial circle of FIG. 8B is inserted into an inner portion of the target circle.
Figure 8D:
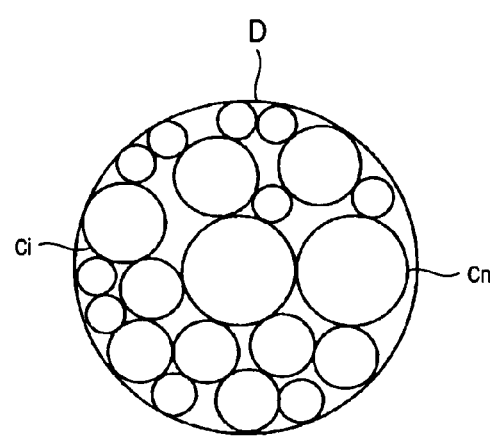
FIG. 8D is a diagram for indicating a final result.

Behavior of the respective circles by the above-explained process sequential operations is represented by using FIGS. 8A to 8D. FIGS. 8A to 8D is a diagram for representing the behavior by the process sequential operation of FIG. 7. More specifically, FIG. 8A shows an initial correction; FIG. 8B indicates an insertion trial circle which is deviated from the target circle; FIG. 8C shows such a condition that the insertion trail circle of FIG. 8B has been inserted into an inner portion of the target circle; and FIG. 8D is a diagram for indicating a final result.

In FIG. 8A, both initial arrangements of "n" pieces of given circles "ci", and the inclusive circle "C" which surrounds these circles "ci" are represented. In FIG. 8B, a condition obtained while the process operation is being carried out is indicated. FIG. 8B shows both a target circle "D" and an insertion trail circle "cn." This target circle "D" is slightly smaller than the inclusive circle "C" which is presently obtained. The insertion trial circle "cn" corresponds to one of circles which are deviated from this target circle "D", and this insertion trial circle "cn" is tried to be inserted.

Also, FIG. 8C shows such a condition that the seek insertion processing operation of the step S5 shown in FIG. 7 has been carried out with respect to the insertion trial circle "cn" shown in FIG. 8B. In FIG. 8C, circles "mi" (namely, circle group for surrounding coarse hatched lines) represent a moved circle group which has be moved so as to insert the insertion trial circle "cn" in the above-described seek insertion process operation. As apparent from this drawing, there are some possibilities that other circles deviated from the target circle "D" are also entered into the target circle "D" in the insertion processing stage of the insertion trial circle "cn." Then, FIG. 8D indicates such a result that the insertion process operations have been carried out with respect to all of the deviated circles.

As previously explained, since the following operations is repeatedly calculated, the outer diameter of the wire harness which surrounds a plurality of wires may be effectively acquired. That is, in the operations, the arrangements of the plural wires which constitute the wire harness are changed in such a manner that these wires are arranged as far as possible from the wire deviated from the inclusive circle, and thus, the deviated wires are inserted into the spaces formed by the above-described arrangement changing operations.

Figure 9:
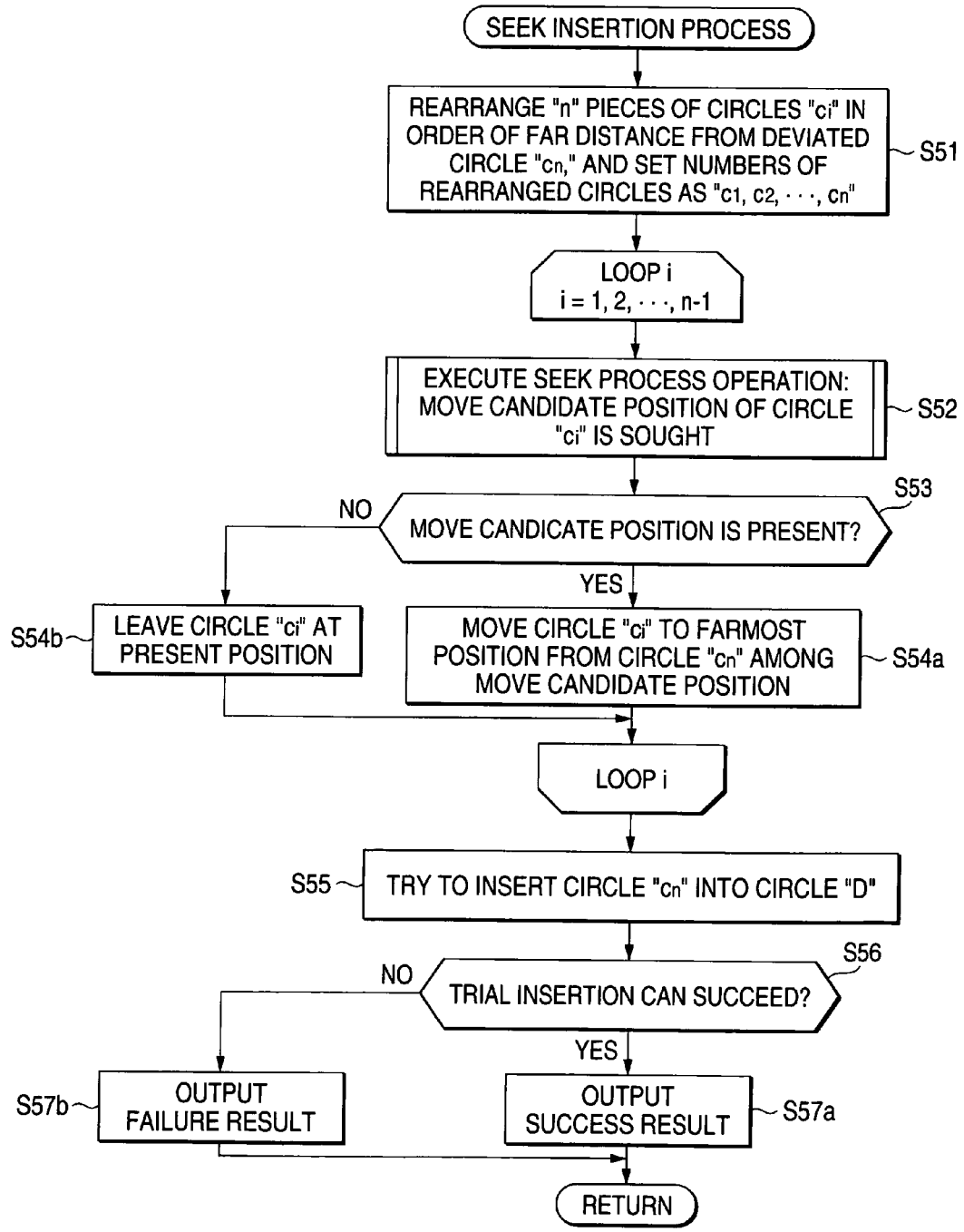
FIG. 9 is a flow chart for representing the seek insertion process operation in FIG. 7.

Next, the seek insertion process operation of the step S5 shown in FIG. 7 is additionally explained with reference to FIG. 9. FIG. 9 is a flow chart for describing the seek insertion process operation in FIG. 7.

In the seek insertion process operation shown in FIG. 9, radii "ri" of "n" pieces of circles "ci", centers (xi, yi) of these circles "ci" (i=1, 2, . . . , n), and a target circle "D" are given as input information. It is so assumed that "n" pieces of these circles "ci" are not overlapped with each other, and the final circle "cn" is deviated from the target circle "D." It should also be noted that other circles which are deviated from the target circle "D" may be alternatively present.

Also, as output information, if the final circle "cn" can be inserted into the target circle "D" while the circles which have already been entered into the target circle "D" are not deviated from this target circle "D", then the center positions of "n" pieces of these circles which may realize this process operation are outputted as a success result. If not, then such a message of this fact is outputted as a failure result.

First, in a step S51 of the seek insertion process operation, "n" pieces of these circles "ci" are rearranged in the order of far distances from the final circle "cn." Precisely speaking, this rearranging order is made based upon distances between the respective centers of "n" pieces of these circles "ci" and the center of the final circle "cn." Then, for the sake of simple explanations, numbers of these circles which have been rearranged are newly defined as c1, c2, . . . , cn. It should also be noted that this final circle will be referred to as an "insertion trail circle" hereinafter.

Next, process operations defined in a step S52 to a step S54a (or step S54b) are carried out with respect to i=1, 2, . . . , n−1. In the step S52, a seek process operation is carried out. In other words, such a move candidate position is searched in which the circles "ci" can be moved within the target circle "D" without being overlapped with other circles. Precisely speaking, in this seek process operation, either a first seek process operation shown in FIG. 10 or a second seek process operation indicated in FIG. 11 is carried out. In the first seek process operation, such a move candidate position is searched in which while the circles "ci" are not overlapped with other circles within the target circle "D", the present positions of the circles "ci" are located far from the insertion trail circle "cn." Also, in the second seek process operation shown in FIG. 11, such a move candidate position is searched in which the circles "ci" can be moved without being overlapped with other circles within the target circle "D" by employing the concept of the circle Voronoi diagram. These first and second seek process operations will be described later.

Then, in the step S53, the step S54a, and the step S54b, if the move candidate position is present in the above-explained seek process operation, then the circles "ci" are moved from the insertion trial circle "cn" to the farmost position among then ("Y" in step S53, and step S54a). To the contrary, if the move candidate position is not present, then the circles "ci" are left at the present positions ("N" in step S53, and step S54b). After such a process operation has been carried out with respect to i=1, 2, . . . , n−1, the process operation is advanced to a step S55. It should also be noted that the above-described steps S52 to S54 correspond to a seeker.

Next, in the step S55, an insertion of the insertion trial circle "cn" is tried to be executed with respect to the spaces within the target circle "D", which could be formed in the loop process operation constituted by the above-described step S52 to step S54a (otherwise, step S54b).

Then, in the step S56, the step S57a, and the step S57b, if the insertion by the above-described insertion trial can succeed, then the insertion trial circle "cn" is moved to this position ("Y" in step S56 and step S57a). To the contrary, if the insertion by the above-described insertion trial cannot succeed, then a message indicating this fact is outputted ("N" in step S56 and step S57b). It should also be noted that, when the insertion can succeed, center positions of "n" pieces of circles which may realize this insertion are outputted. Then, when a series of process operations constituted by these step S51 to step S57a (or step S57b) are accomplished, the process operation is returned to the succeeding process operation thereof shown in FIG. 7.

Furthermore, two examples of the above-described seek process operations will now be additionally explained with reference to FIG. 10 and FIG. 11. A first description is made of the first seek process operation with reference to FIG. 10. FIG. 10 is a flow chart for describing the first seek process operation.

In the first seek process operation of FIG. 10, an attention is paid to such a fact that when there are spaces where "n" pieces of circles "ci" are moved, the circle "ci" must be made in contact to two circles under the condition that the circle "ci" has been moved to the farmost position from the above-explained insertion trial circle "cn." It should also be understood that there are some possibilities that one of these two circles to which the circle "ci" is contacted is equal to the above-explained target circle "D." Accordingly, in this case, it is so defined that a set which is constituted by "n" pieces of the given circles "ci" and the target circle "D" is defined by S={c1, c2, . . . , cn, D}. Then, with respect to all of two circles "cj", and "ck, ϵS" other than the circle "ci", process operations shown in the below-mentioned steps S521 to S529 are carried out.

First, in the step S521, such a position that the circle "ci" having the radius "ri" is contacted to both a circle "cj" and another circle "ck" is searched. It is so assumed that if either the circle "cj" or the circle "ck" corresponds to a circle other than the target circle "D", then the circle "ci" having the radius "ri" is contacted from the outer side, whereas if either the circle "cj" or the circle "ck" corresponds to the target circle "D", then the circle "ci" having the radius "ri" is contacted from the inner side. Such positions are merely only two positions. In this case, centers of these two positions are assumed as (x'i, y'i) and (x"i, y"i).

Next, in the step S522, a judgment is made as to whether or not the circle "ci" is located far from the insertion trial circle "Cn" rather than the present position when the circle "ci" is moved to one position of the above-described two positions. In other words, a distance "X'" defined from one center (x'i, y'i) to the insertion trail circle "Cn" is compared with another distance "X" defined from the center of the circle "ci" of the present position to the center of the insertion trial circle "Cn". If the distance "X'" is longer than the distance "X", then the process operation is advanced to a step S523 ("Y" in step S522). To the contrary, if the distance "X'" is not longer than the distance "X", then the process operation is advanced to a step S526 ("N" in step S522).

In the step S523, a check is made as to whether or not the circle "ci", the circle "cj", the circle "ck", and all circles other than the target circle "D" are overlapped with each other when the circle "ci" having the radius "ri" is positioned to the above-described center (x'i, y'i). In the step S524, a judgment is made of this overlapping state. When it is so judged that any of these circles are not overlapped with each other, the process operation is advanced to a step S524 ("N" in step S524). In this step S524, the above-described center position (x'i, y'i) is added to one of the move candidate positions of the circle "ci." To the contrary, when it is so judged that any of these circles are overlapped with each other, the process operation is advanced to a step S526 ("Y" in step S524).

In addition, the above-explained one center (x'i, y'i) is substituted by the other center (x"i, y"i), process operations defined from a step S526 to a step S529 are carried out in a similar manner to those defined from the step S522 to the step S525. In the step S526, a judgment is made as to whether or not the circle "ci" is located far from the insertion trial circle "Cn" rather than the present position when the circle "ci" is moved to the other position of the above-described two positions. In other words, a distance "X''" defined from the other center (x"i, y"i) to the insertion trial circle "Cn" is compared with another distance "X" defined from the center of the circle "ci" of the present position to the center of the insertion trial circle "Cn." If the distance "X''" is longer than the distance "X", then the process operation is advanced to a step S527 ("Y" in step S526). To the contrary, if the distance "X''" is not longer than the distance "X", then the process operation is directly advanced to the next step ("N" in step S526).

In the step S527, a check is made as to whether or not the circle "ci", the circle "cj", the circle "ck", and all circles other than the target circle "D" are overlapped with each other when the circle "ci" having the radius "ri" is positioned to the above-described center (x"i, y"i). In the step S528, a judgment is made of this overlapping state. In this step, when it is so judged that any of these circles are not overlapped with each other, the process operation is advanced to a step S529 ("N" in step S528). In the step S529, the above-described center (x"i, y"i) is added to one of the move candidate positions of the circle "ci." To the contrary, when it is so judged that any of these circles are overlapped with each other, the process operation is directly advanced to the next step ("Y" in step S528). When such a process operation is carried out with respect to all of the two circles "cj" and "ck" other than the circle "ci", the process operation is returned to the subsequent process operation shown in FIG. 9.

Since such a first seek process operation is carried out, the calculation as to the outer diameter of the wire harness can be improved, while this outer diameter calculation has been preformed in accordance with the method shown in FIG. 9 and experiences, so that this outer diameter calculation can be more correctly carried out. As a consequence, this first seek process operation may give a help in designing of the wire harness. On the other hand, when the first seek process operation is employed, there is a problem that a calculation amount becomes huge. In other words, in the first seek process operation shown in FIG. 10, since the above-explained process operations are carried out with respect to the set of the circle "ci", the circle "cj", and the circle "ck", a total calculation time thereof amounts to O(n3). In the above-explained seek insertion process operation of FIG. 9, since this seek insertion process operation is carried out with respect to all of i=1, 2, . . . , n, a total calculation time thereof amounts to O(n4). Moreover, in the inclusive circle process operation of FIG. 7, since this process operation is combined with the seek insertion process operation and the combined process operation is repeatedly carried out, an entire calculation amount may become huge. This calculation amount aspect may be improved in the second seek process operation shown in FIGS. 12A to 12C.

Figure 12A:
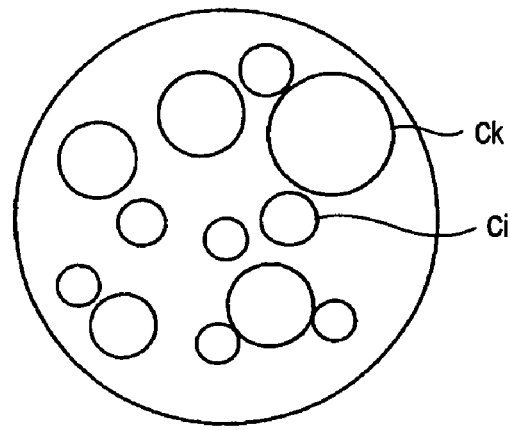
FIG. 12A is a diagram for showing one example as to a set of circles.
Figure 12B:
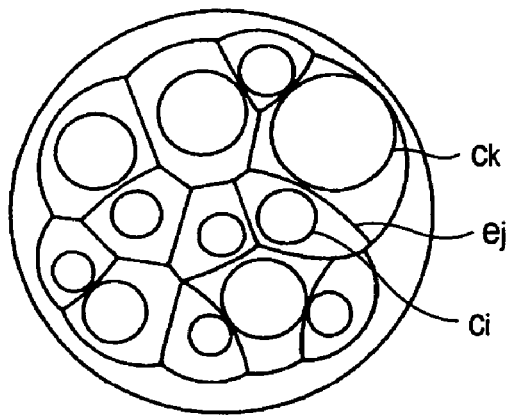
FIG. 12B and FIG. 12C are diagrams for representing both a circle Voronoi diagram and a Laguerre circle Voronoi diagram with respect to the set of circles of FIG. 12A.
Figure 12C:
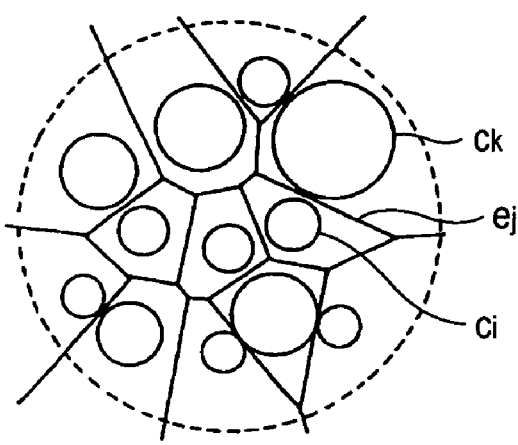

FIG. 11 is a flow chart for explaining the second seek process operation. FIG. 12A is a diagram for representing one example as to a set of circles. FIG. 12B is a circle Voronoi diagram with respect to the set of circles of FIG. 12A. FIG. 12C is a Laguerre circle Voronoi diagram with respect to the set of circles of FIG. 12A.

First, a basic idea of this second seek process operation is indicated. In this second seek process operation, while the known concept of the Voronoi diagram is utilized, the move candidate position of the insertion trial circle "ci" is effectively searched. In other words, in the above-described first seek process operation, in order to acquire the move candidate position of this circle "ci", all of the positions where the set of circles "ci" and "ck" are contacted are acquired. However, when the concept of the Voronoi diagram is utilized, this candidate may be limited.

When a finite piece of circles are given which are not overlapped with each other on a plane, the plane may be subdivided by considering that the plane is located at the nearest position with respect to which circle. This subdivided diagram is called as a "circle Voronoi diagram", and this circle Voronoi diagram is also described in the above-described non-patent publication 1.

For instance, a circle Voronoi diagram with respect to the circle group shown in FIG. 12A is given as represented in FIG. 12B. A point on a boundary edge "ej" (called as "Voronoi edge") in FIG. 12B owns such a nature that while this point is separated from the two circles "ck" and "cl" by equal distances, other circles are separated further far from this point. As a consequence, such a circle which is contacted to the two circles "ck" and "cl" and is not overlapped with other circles owns a center thereof on the boundary edge "ej" of the circle Voronoi diagram. As a result, a move candidate position of the circle "cl" may be searched with respect to only a set of these two circles "ck" and "cl", which sandwich the boundary edge "ej" of the circle Voronoi diagram. Since a total number of the boundary edges "ej" of the circle Voronoi diagrams as to "n" pieces of circles is directly proportional to "n", set of the circles "ck" and "cl" which should be retrieved are equal to O(n) in this second seek process operation, whereas the sets of the circles "ck" and "cl" are equal to O(n2) in the first seek process of FIG. 10.

Furthermore, with respect to the move candidate position of the circle "ci" which is contacted to the two circles "ck" and "cl", the check has been made as to whether or not all of the circles "cj" and "ck" other than the circle "ci" are overlapped with each other in the first seek process operation of FIG. 10. However, in this second seek process operation, such a checking operation is no longer required. That is, in this second seek process operation, it is sufficient to check as to whether or not the move candidate position of the circle "ci" is located on the boundary edge "ej." This reason is given as follows: That is, if the move candidate position is located on the boundary edge "ej", then the circle "ci" is not overlapped with other circles, whereas if the move candidate position is not located on the boundary edge "ej", then the circle "ci" is overlapped with the other circles, which may be conducted from the nature of the circle Voronoi diagram. As a result, the check time of "O(n)" may be changed to "O(l)."

Based upon such a concept, a process sequence of the second seek process operation is described in the flow chart of FIG. 11. In a step S521' of FIG. 11, the above-explained circle set S-{ci} is formed. Namely, a circle Voronoi diagram with respect to all circles other than the circle "ci" is formed.

In this case, since this circle set S-{ci} is arranged by "n" pieces of circles, a total number of boundary edges is also directly proportional to "n."

Then, with respect to the respective boundary edges "ej (j=1, 2, . . . , n)", the below-mentioned process operations defined from a step S522' to a step S525' are carried out.

In the step S522', such a circle "ci'" having a radius "ri" is formed which is contacted to the circles "ck" and "cl" provided on both sides of the boundary edge "ej." It should also be assumed that if either the circle "ck" or the circle "cl" corresponds to any circle other than the target circle "D", then the circle "ci'" is contacted from the outer side to the circles "ck" and "cl", whereas if either the circle "ck" or the circle "cl" corresponds to the target circle "D", then the circle "ci'" is contacted from the inner side to the circles "ck" and "cl." It should also be understood that a total number of such circles are merely 2 pieces.

Then, in the step S523', it is so judged that there is the circle "ci'" having the radius "ri" which is contacted to the above-explained circles ("Y" in step S523'). Further, in the step S524', if such a judgment is made that the center of the circle "ci'" is located on the boundary edge "ej" ("Y" in step S524'), then the process operation is advanced to the step S525' in which this circle "ci'" is added to the move candidate position of the circle "ci." To the contrary, if the circle "ci'" is not present, and if such a judgment is made that the center of the circle "ci'" is not located on the boundary edge "ej" ("N" in step S523', and "N" in step S524'), then the process operation is directly advanced to the next process operation. When such a process operation is carried out with respect to all of the boundary edges "ej", the process operation is returned to the subsequent process operation shown in FIG. 9.

As apparent from the above explanation, the following fact can be understood. That is, since the concept of the Voronoi diagram is utilized, the move candidate position of the circle "ci" can be sought in a very simple manner. Such a fact that the circle Voronoi diagrams as to "n" pieces of circles can be formed in the calculation time of "O(n logn)" is described in the above-explained non-patent publication 1. As a result, the process operation of the above-described step S521' can be executed in the calculation time of "(n long)." On the other hand, since a total number of the boundary edges of the circle Voronoi diagrams as to "n" pieces of circles is only the number which is directly proportional to "n", the above-explained process operations defined from the step S522' to the step S524' can be executed in a calculation time of "O(n)." As previously explained, a calculation time of the second seek process operation shown in FIG. 11 amounts to "O(n logn)." For the sake of references, since the first seek process operation shown in FIG. 10 requires the calculation time of "O(n3)", it can be understood that the efficiency of the seeking process operation can be largely improved. For instance, if the second seek process operation of FIG. 11 is combined with the seek insertion process operation of FIG. 9, then a calculation time of the seek insertion process operation shown in FIG. 9 amounts to "O(n2 logn)", since this second seek process operation of FIG. 11 is carried out "O(n)" times in the seek insertion process operation of FIG. 9.

A simple calculation method for the above-described Voronoi diagram is the following method (see FIG. 12C). That is, in this simple calculation method, while the Laguerre Voronoi diagram described in the above-explained non-patent publication 1 is formed, this Lagueree Voronoi diagram is modified into a circle Voronoi diagram by way of the flip operation of the edges, which is described in both the non-patent publication 2 and the non-patent publication 3.

As previously explained, in accordance with this inclusive circle calculating process operation, since the following operation is repeatedly calculated, the outer diameter of the wire harness which surrounds a plurality of wires can be acquired in the effective manner. In this operation, while the computer is employed, the arrangement of the plural wires which constitute the wire harness are changed in such a manner that these plural wires are separated as far as possible from the wires deviated from the inclusive circle, and then, the deviated wires are inserted into the spaces which are formed by this arrangement change. In particular, since the concept of the circle Voronoi diagram is employed, the outer diameter of the wire harness can be acquired in a very simple manner and within a short time.

As indicated in FIG. 3, in order to effectively utilize such an inclusive circle calculating process operation, the group of such circles which may be regarded as the small circles is one removed from a plurality of circles, the primary inclusive circle is acquired by employing only the large circles by executing the inclusive circle calculating process operation, and thereafter, the small circles which have been once removed are added to this primary inclusive circle so as to calculate the final inclusive circle by executing the above-described inclusive circle calculating process operation. As a result, the calculation amount for acquiring the final inclusive circle can be largely reduced. As a consequence, the time required to acquire the final inclusive circle from the initial condition that the circles corresponding to a plurality of wires having the different diameters have been arbitrarily arranged can be shortened, namely, the packing calculation time of the wire harness can be largely shortened. For instance, the following calculation time reduction could be confirmed. That is, the calculation time which required 0.4641 msec by executing only the process operation of FIG. 7 could be shortened to 0.18905 msec by executing the process operation of FIG. 3. In this case, the final inclusive circles having the equivalent sizes could be obtained.

It should also be noted that in the above-explained embodiment, in order to calculate the outer diameter of the wire harness, the radius has been outputted. Alternatively, a diameter may be alternatively outputted. Also, the values as to "p" and "r" employed in the inclusive circle calculating process operation are not limited only to the values described in the above-explained embodiment, but may be properly changed within the scope of the gist of the present invention. Furthermore, the present invention may be applied not only to the wire harness which is arranged in the distribution manner within the vehicle, but also to such a wire harness which is arranged in the distribution manner in an indoor space, or the like.

What is claimed is:

1. A calculation method for packing a plurality of wires constituting a wire harness, in which sectional shapes of the plurality of wires are regarded as a plurality of circles having diameters corresponding to the respective outer shapes of the wires, the calculation method, comprising the steps of:

removing a first circle, which is smaller than a predetermined value, from the plurality of circles in accordance with a predetermined reference;

forming a primary inclusive circle as small as possible in which a plurality of second circles, which are rest circles removed the first circle from the plurality of circles, are included in the primary inclusive circle so as not to be overlapped with each other;

calculating first position information regarding a position of the primary inclusive circle and the second circles included in the primary inclusive circle;

forming a final inclusive circle as small as possible in which the first circle is arranged in the primary inclusive circle while the second circles are fixed in the primary inclusive circle in accordance with the first position information such that the first circle and the second circles are not overlapped with each other;

calculating second position information regarding a position of the final inclusive circle; and outputting the second position information, wherein:

the primary inclusive circle forming step and the final inclusive circle forming step respectively includes the steps of:

supposing an inclusive circle which includes the plurality of circles arranged such that the plural circles are not overlapped with each other on a plane;

defining a target circle which has the same center as that of the inclusive circle, the target circle being smaller than the inclusive circle, and at least one of the circles being deviated from the target circle;

seeking a position where the plurality of circles other than an insertion trail circle are arranged as far as possible from the insertion trial circle within the target circle without being overlapped with each other, while the circle deviated from the target circle is defined as the insertion trial circle;

inserting the insertion trial circle into a space within the target circle, the space being generated by changing the arrangement of the plural circles based on a seek result of the seeking step;

defining a new target circle which is slightly smaller than the target circle and contains the insertion trial circle when an entire portion of the insertion trial circle is inserted within the target circle, and returning to the seeking step; and repeating the target circle defining step, the seeking step, the inserting step, and the new target circle defining step for gradually decreasing the inclusive circle.

2. The calculation method as set forth in claim 1 wherein:

in the second position information calculating step, third position information regarding positions of the first and second circles included in the final inclusive circle is further calculated; and in the output step, the third position information is further outputted.

3. The calculation method as set forth in claim 1 wherein:

in the final inclusive circle forming step, the first circle is arranged in the primary inclusive circle so as to be close to a center of the primary inclusive circle as close as possible without overlapping the first and second circles with each other.

4. The calculation method as set forth in claim 2, further comprising the step of:

simply forming a primary inclusive circle in which the plurality of second circles are included in the primary inclusive circle, in a state that the second circles are contacted with each other without being overlapped with each other, when a total number of the second circles is smaller than or equal to 3, instead of the primary inclusive circle forming step.

5. The calculation method as set forth in claim 4, further comprising the step of:

determining the primary inclusive circle as the final inclusive circle instead of the final inclusive circle forming step, in a case that the first circle is included in the primary inclusive circle such that the first and second circles are not overlapped with each other in either the primary inclusive circle forming step or the primary inclusive circle simple forming step.

6. The calculation method as set forth in claim 1 wherein:

the predetermined reference is determined based on respective diameters of the plurality of wires which are generally used as wires for constituting the wire harness.

7. The calculation method as set forth in claim 1 wherein:

the predetermined reference is determined based on a diameter size of the wire which has a predetermined order in the diameter size among the plurality of wires.

8. The calculation method as set forth in claim 1 wherein:

in the seeking step, a circle Voronoi diagram is formed by the target circle and a circle group made by the insertion trial circle and the plurality of circles from which one circle is removed, and a position is sought where the plurality of circles other than the insertion trail circle are allowed to be moved within the target circle by checking as to whether or not a center of the one circle, which is contacted to both-sided circles for forming the respective boundary edges in the circle Voronoi diagram, is present on the boundary edge with respect to the plurality of circles other than the insertion trial circle.

9. The calculation method as set forth in claim 1, further comprising:

defining a next target circle which has an intermediate size between the size of the inclusive circle and the size of the present target circle and contains the insertion trial circle when the insertion trial circle cannot be inserted in the repeating step, and returns to the seek step.

10. A computer readable memory used for packing a plurality of wires constituting a wire harness, in which sectional shapes of the plurality of wires are regarded as a plurality of circles having diameters corresponding to the respective outer shapes of the wires, the computer readable memory containing instructions which perform the following steps:

removing a first circle, which is smaller than a predetermined value, from the plurality of circles in accordance with a predetermined reference;

forming a primary inclusive circle as small as possible in which a plurality of second circles, which are rest circles removed the first circle from the plurality of circles, are included in the primary inclusive circle so as not to be overlapped with each other;

calculating first position information regarding a position of the primary inclusive circle and the second circles included in the primary inclusive circle;

forming a final inclusive circle as small as possible in which the first circle is arranged in the primary inclusive circle while the second circles are fixed in the primary inclusive circle in accordance with the position information such that the first circle and the second circles are not overlapped with each other;

calculating second position information regarding a position of the final inclusive circle; and the second position information, wherein:

the primary inclusive circle forming step and the final inclusive circle forming step respectively includes the steps of:

supposing an inclusive circle which includes the plurality of circles arranged in such a manner that the plural circles are not overlapped with each other on a plane;

defining a target circle which has the same center as that of the inclusive circle, the target circle being slightly smaller than the inclusive circle, and at least one of the circles being deviated from the target circle;

seeking a position where the plurality of circles other than an insertion trial circle are arranged as far as possible from the insertion trial circle within the target circle without being overlapped with each other, while the circle deviated from the target circle is defined as the insertion trial circle;

inserting unit inserting the insertion trial circle into a space within the target circle, the space being formed by changing the arrangement of the plural circles based on a seek result of the seeking unit;

defining a new target circle which is slightly smaller than the target circle and contains the insertion trial circle when an entire portion of the insertion trial circle is inserted within the target circle and returning to a procedure of the seeking unit;

repeating the target circle defining step, the seeking step, the inserting step, and the new target circle defining step for gradually decreasing the inclusive circle.

11. The computer readable memory as set forth in claim 10, said computer readable memory containing instructions which perform the additional step of:

simply forming a primary inclusive circle in which the plurality of second circles are included in the primary inclusive circle in a state that the second circles are contacted with each other without being overlapped with each other, when a total number of the second circles is smaller than or equal to 3, instead of the primary inclusive circle forming step.

12. The computer readable memory as set forth in claim 11, said computer readable memory containing instructions which perform the additional step of:

determining the primary inclusive circle as the final inclusive circle when the first circle is included in the primary inclusive circle such that the first and second circles are not overlapped with each other in either the primary inclusive circle forming step or the primary inclusive circle simple forming step, instead of the final inclusive circle forming step.

* * * * *